United States Patent
Arai

(10) Patent No.: US 7,515,352 B2
(45) Date of Patent: Apr. 7, 2009

(54) ZOOM LENS SYSTEM AND OPTICAL DEVICE USING THEREOF

(75) Inventor: Daisaku Arai, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 11/702,086

(22) Filed: Feb. 5, 2007

(65) Prior Publication Data

US 2007/0195425 A1   Aug. 23, 2007

(30) Foreign Application Priority Data

Feb. 17, 2006  (JP)  ............................ 2006-041510
Feb. 17, 2006  (JP)  ............................ 2006-041515

(51) Int. Cl.
*G02B 15/14* (2006.01)
(52) U.S. Cl. .................... 359/687; 359/686; 359/715
(58) Field of Classification Search ................. 359/687, 359/686, 684, 715
See application file for complete search history.

(56) References Cited

U.S. PATENT DOCUMENTS

| | | | | |
|---|---|---|---|---|
| 5,963,378 | A * | 10/1999 | Tochigi et al. | 359/687 |
| 6,259,508 | B1 * | 7/2001 | Shigematsu | 355/53 |
| 6,473,231 | B2 | 10/2002 | Hamano et al. | 359/557 |
| 6,606,194 | B2 | 8/2003 | Hamano et al. | 359/557 |
| 6,995,922 | B2 | 2/2006 | Mihara et al. | 359/689 |
| 7,068,429 | B1 | 6/2006 | Ori | 359/557 |
| 7,312,934 | B2 * | 12/2007 | Iwasawa | 359/764 |
| 2005/0088756 | A1 * | 4/2005 | Yamada | 359/687 |
| 2005/0168833 | A1 * | 8/2005 | Horiuchi | 359/687 |
| 2006/0274426 | A1 | 12/2006 | Sueyoshi | 359/676 |

FOREIGN PATENT DOCUMENTS

| | | |
|---|---|---|
| EP | 1 717 624 | 11/2006 |
| JP | 11-23969 | 1/1999 |
| JP | 2004-102089 | 4/2004 |
| JP | 2004-102090 | 4/2004 |
| JP | 2004-252196 | 9/2004 |
| JP | 2001-195757 | 7/2005 |
| JP | 2005-215165 | 8/2005 |

* cited by examiner

*Primary Examiner*—Timothy J Thompson
(74) *Attorney, Agent, or Firm*—Miles & Stockbridge P.C.

(57) ABSTRACT

Providing an ultra-compact zoom lens system having a vibration reduction function, suitable for a compact optical device using a solid-state imaging device. The system includes, in order from an object, a first lens group having positive power and a bending member for bending the optical path by about 90°, a second lens group having negative power, a third lens group having positive power, and a fourth lens group having positive power. Upon zooming from a wide-angle end state to a telephoto end state, the first and third lens groups are fixed with respect to an image plane, the second lens group is moved to the image, and the fourth lens group is moved at first to the object and then to the image plane. An image blur on the image plane caused by a camera shake is corrected by moving the third lens group perpendicularly to the optical axis.

19 Claims, 38 Drawing Sheets

FIG. 4A
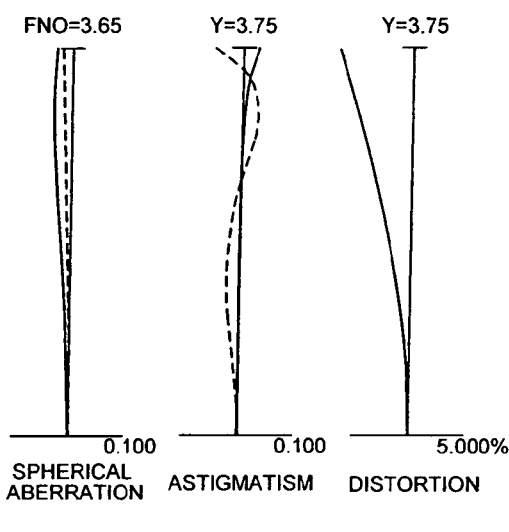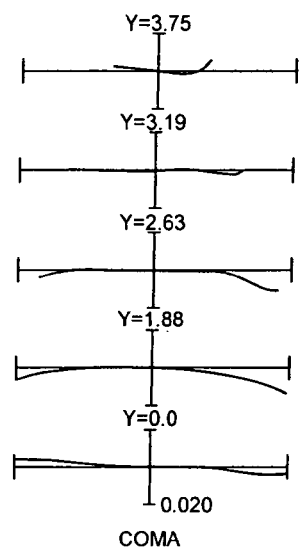
FIG. 4B
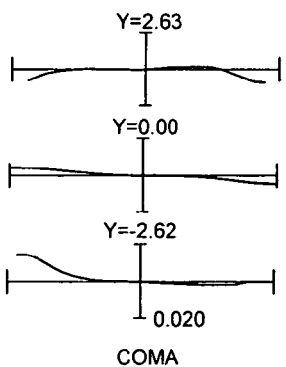

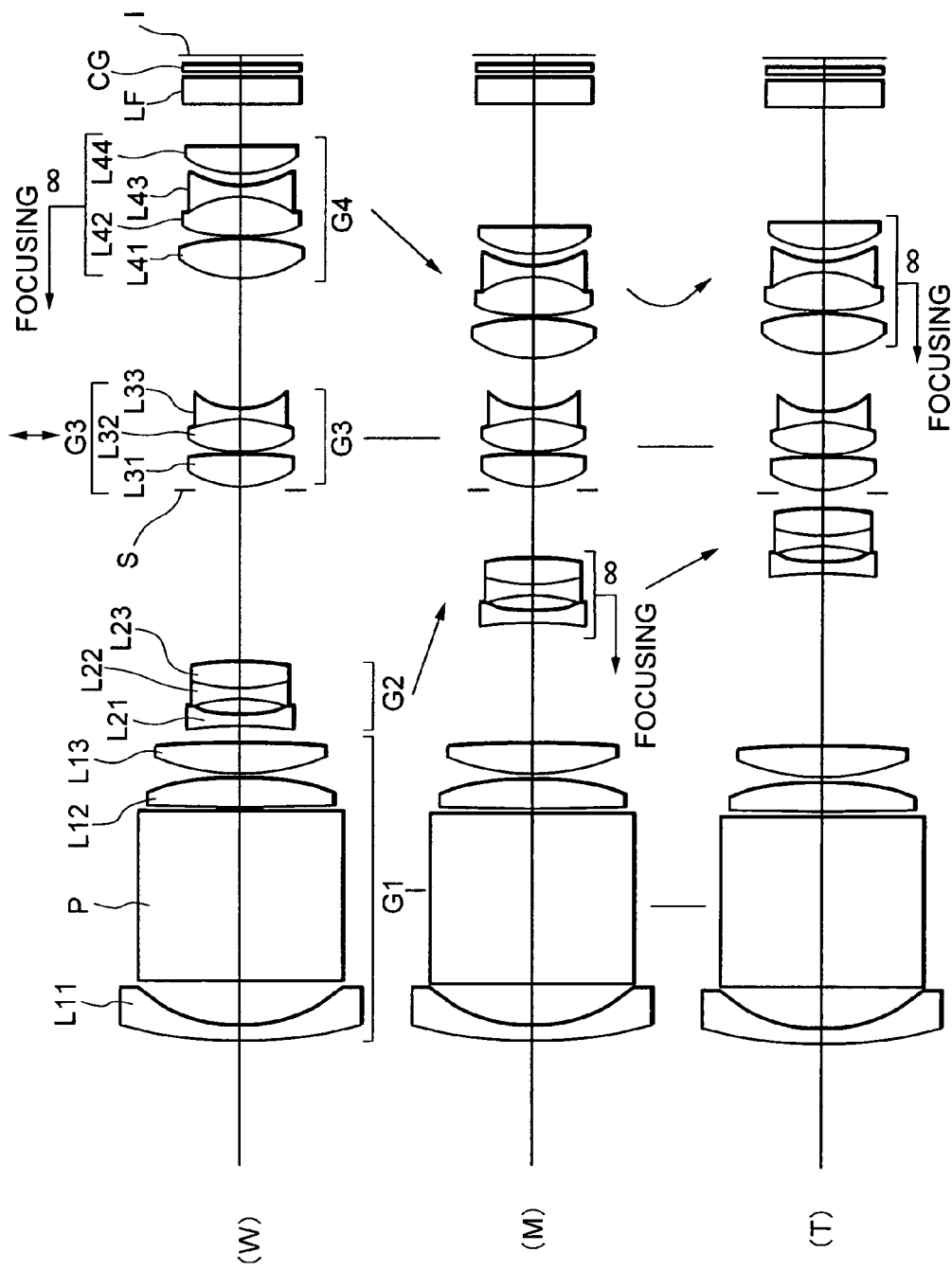

FIG. 22A
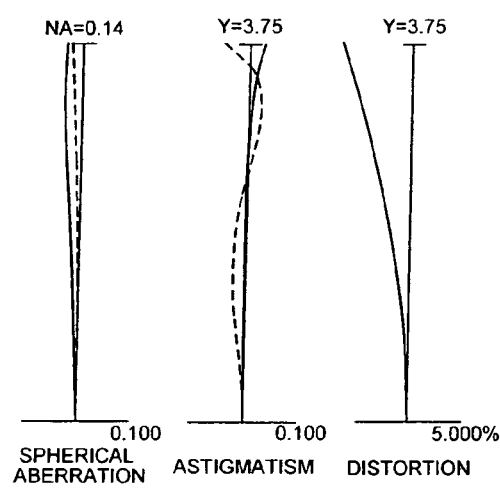
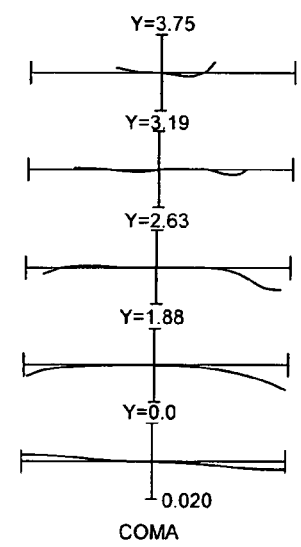
FIG. 22B
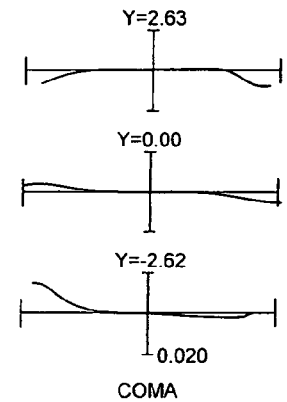

FIG. 23A
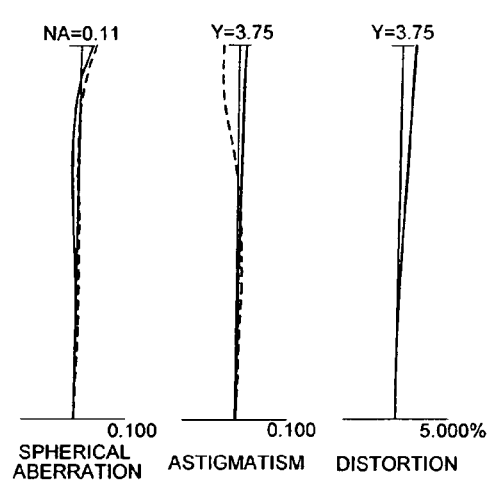
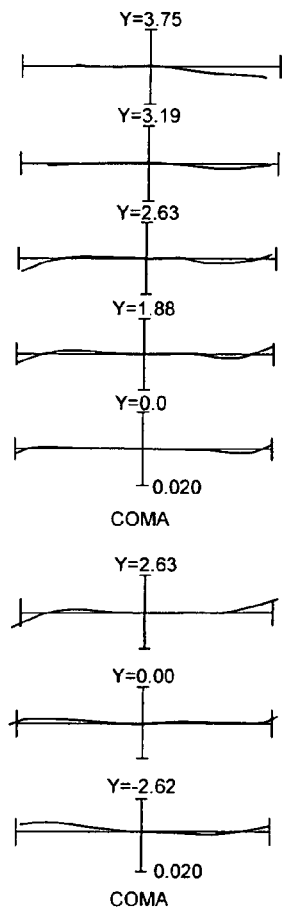
FIG. 23B

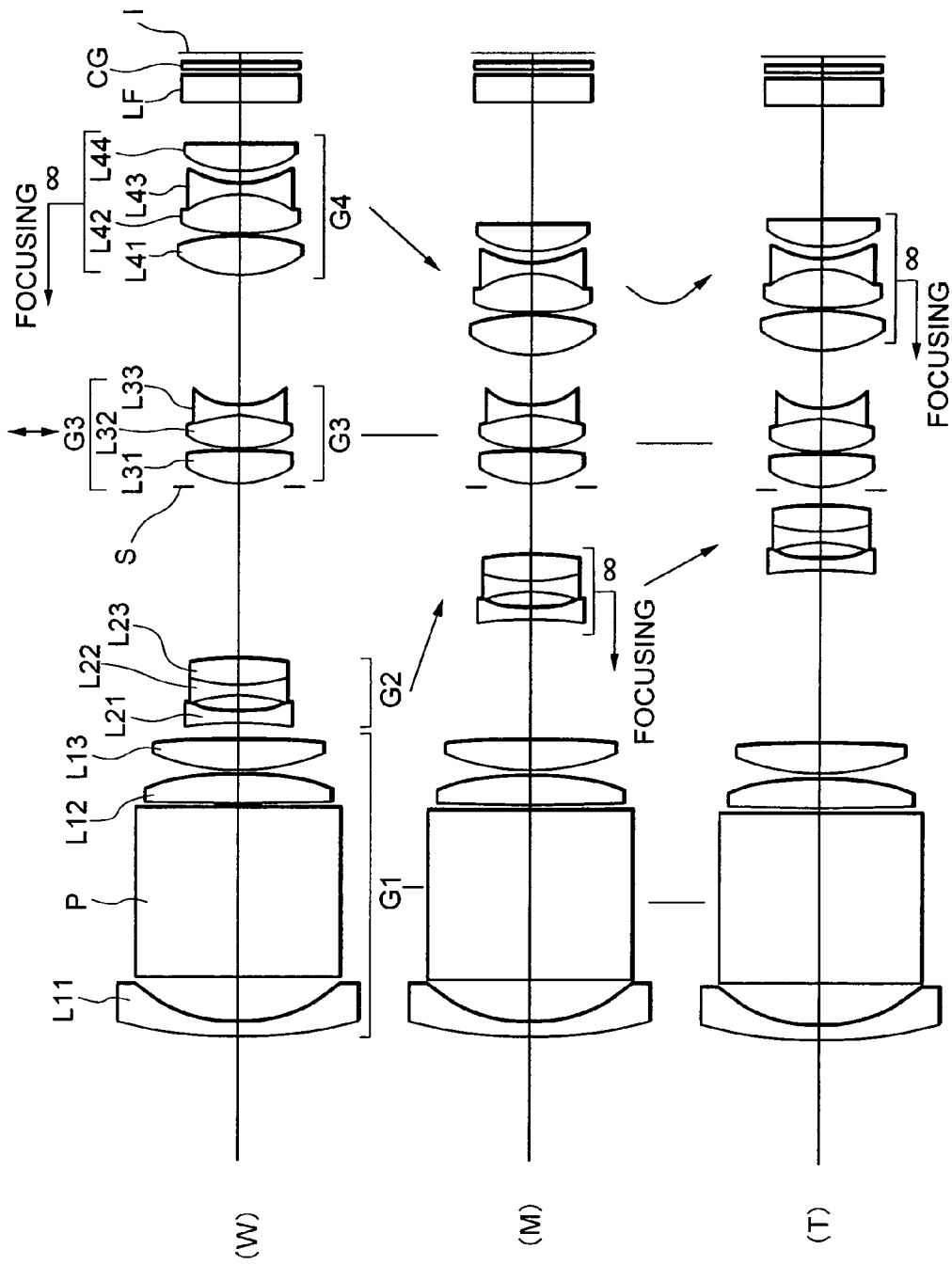

FIG. 34A
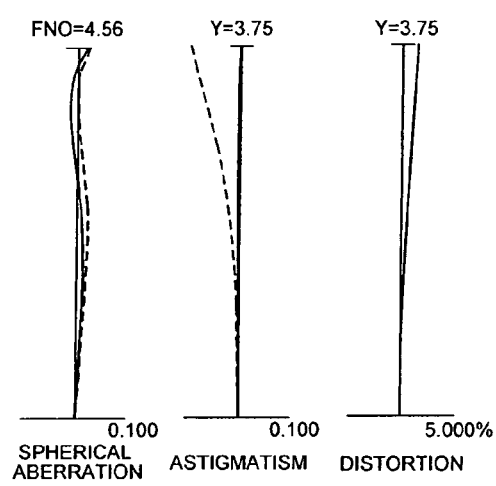
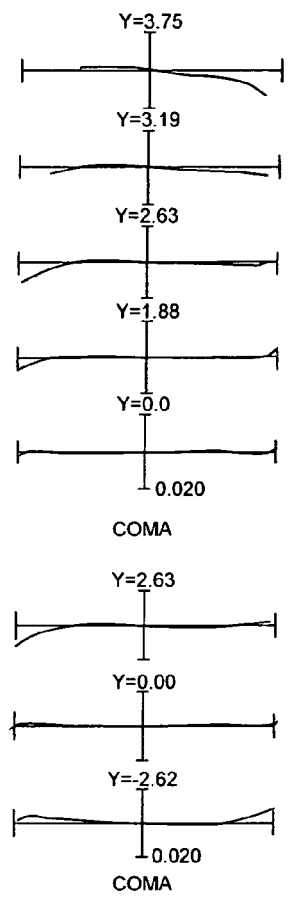
FIG. 34B

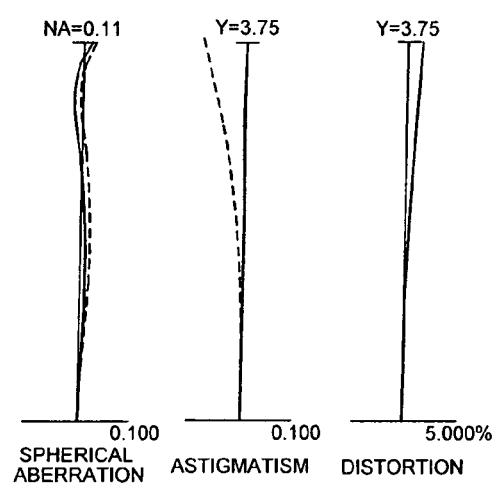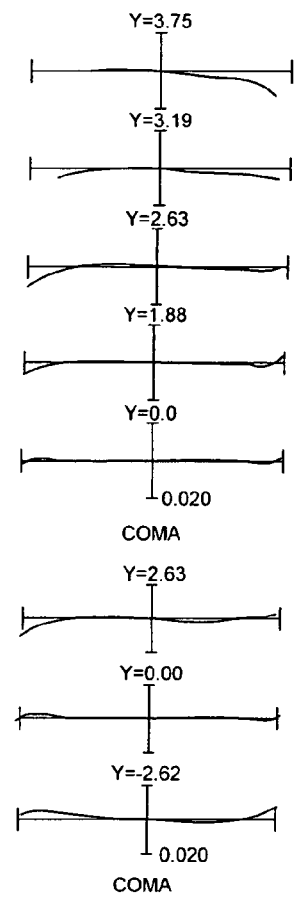
FIG. 37A
FIG. 37B

ZOOM LENS SYSTEM AND OPTICAL DEVICE USING THEREOF

The disclosure of the following priority applications are herein incorporated by reference:

Japanese Patent Application No. 2006-041510 filed on Feb. 17, 2006, and

Japanese Patent Application No. 2006-041515 filed on Feb. 17, 2006.

BACKGROUND OF THE INVENTION

1. Field of the Invention

The present invention relates to a zoom lens system and an optical device using thereof.

2. Related Background Art

There has been proposed a bended zoom lens system (hereinafter simply called as a zoom lens system) suitable for a camera using a solid-state imaging device and the like, having a zoom ratio of about three to seven by using a rectangular prism for bending an optical path within the camera (for example, Japanese Patent Application Laid-Open No. 2005-215165).

In such a zoom lens system, there has been a problem that a minute camera shake generated upon shooting such as a camera shake generated when a photographer presses a shutter release button causes an image blur to deteriorate imaging performance. Accordingly, there has been expected a zoom lens system having a function to correct the image blur on the image plane by shifting a portion of an optical system of the zoom lens system in a direction substantially perpendicular to the optical axis on the basis of an output value from a detector for detecting the camera shake.

Moreover, a further compact zoom lens system with high optical performance has been expected in a camera equipped with such a zoom lens, in order to make the whole camera compact.

SUMMARY OF THE INVENTION

The present invention is made in view of the aforementioned problems and has an object to provide a zoom lens system having a vibration reduction function, a high optical performance, and an ultra-compactness, suitable for a compact optical device using a solid-state imaging device, and the like, and another object to provide an optical device using the zoom lens system.

According to a first aspect of the present invention, there is provided a zoom lens system comprising, in order from an object along an optical axis: a first lens group having positive refractive power and an optical path bending member for bending the optical path by substantially 90 degrees; a second lens group having negative refractive power; a third lens group having positive refractive power; and a fourth lens group having positive refractive power. When a focal length varies from a wide-angle end state to a telephoto end state, the first lens group and the third lens group are fixed with respect to an image plane, the second lens group is moved to the image plane, and the fourth lens group is moved at first to the object and then to the image plane. An image blur on the image plane caused by a camera shake is corrected by moving the third lens group in a direction perpendicular to the optical axis.

In the first aspect of the present invention, it is preferable that the third lens group comprises, in order from the object along the optical axis, a positive lens and a cemented lens constructed by a positive lens cemented with a negative lens.

In the first aspect of the present invention, it is preferable that the fourth lens group comprises, in order from the object along the optical axis, a positive lens, a cemented lens constructed by a positive lens cemented with a negative lens, and a positive lens.

In the first aspect of the present invention, it is preferable that the first lens group comprises, in order from the object along the optical axis, a negative lens, the optical path bending member, a positive lens, and a positive lens.

In the first aspect of the present invention, it is preferable that the optical path bending member is a rectangular prism.

In the first aspect of the present invention, it is preferable that an aperture stop is disposed in the vicinity of the third lens group including in the third lens group.

In the first aspect of the present invention, it is preferable that focusing from infinity to a close object is carried out by moving the fourth lens group along the optical axis.

According to a second aspect of the present invention, there is provided an optical device equipped with the zoom lens system according to the first aspect of the present invention.

According to a third aspect of the present invention, there is provided a method for forming an image of an object and varying a focal length of a zoom lens system, the method comprising steps of: providing the zoom lens system that includes, in order from an object along an optical axis, a first lens group having positive refractive power and an optical path bending member for bending the optical path by substantially 90 degrees, a second lens group having negative refractive power, a third lens group having positive refractive power, and a fourth lens group having positive refractive power; varying the focal length of the zoom lens system from a wide-angle end state to a telephoto end state by fixing the first lens group and the third lens group with respect to an image plane, moving the second lens group to the image plane, and moving the fourth lens group at first to the object and then to the image plane; and correcting an image blur on the image plane upon generating the camera shake by moving the third lens group in a direction perpendicular to the optical axis.

In the third aspect of the present invention, it is preferable to further comprise a step of: carrying out focusing from infinity to a closed object by moving the fourth lens group along the optical axis.

In the third aspect of the present invention, it is preferable to further comprise a step of: providing the third lens group that comprises, in order from the object along the optical axis, a positive lens and a cemented lens constructed by a positive lens cemented with a negative lens.

According to a fourth aspect of the present invention, there is provided a zoom lens system comprising, in order from an object along an optical axis: a first lens group having an optical path bending member for bending the optical path by substantially 90 degrees; a second lens group; a third lens group; and a fourth lens group. When a focal length varies from a wide-angle end state to a telephoto end state, the first lens group and the third lens group are fixed with respect to an image plane, the second lens group is moved to the image plane, and the fourth lens group is moved at first to the object and then to the image plane. Focusing from infinity to a close object is carried out by moving the fourth lens group along the optical axis in the wide-angle end state and the telephoto end state, and carried out by moving the second lens group along the optical axis in the other focal length states.

In the fourth aspect of the present invention, it is preferable that the first lens group has positive refractive power, the second lens group has negative refractive power, the third lens group has positive refractive power, and the fourth lens group has positive refractive power.

In the fourth aspect of the present invention, it is preferable that the third lens group comprises, in order from the object along the optical axis, a positive lens and a cemented lens constructed by a positive lens cemented with a negative lens.

In the fourth aspect of the present invention, it is preferable that the fourth lens group comprises, in order from the object along the optical axis, a positive lens, a cemented lens constructed by a positive lens cemented with a negative lens, and a positive lens.

In the fourth aspect of the present invention, it is preferable that the first lens group comprises, in order from the object along the optical axis, a negative lens, the optical path bending member, a positive lens, and a positive lens.

In the fourth aspect of the present invention, it is preferable that the optical path bending member is a rectangular prism.

In the fourth aspect of the present invention, it is preferable that an aperture stop is disposed in the vicinity of the third lens group including in the third lens group.

In the fourth aspect of the present invention, it is preferable that at least one aspherical lens is included in each of the first lens group through the fourth lens group.

In the fourth aspect of the present invention, it is preferable that an image blur on the image plane upon generating a camera shake is corrected by moving the third lens group in a direction perpendicular to the optical axis.

According to a fifth aspect of the present invention, there is provided an optical device equipped with the zoom lens system according to any of the fourth aspect of the present invention.

According to a sixth aspect of the present invention, there is provided a method for forming an image of an object and varying a focal length of a zoom lens system, the method comprising steps of: providing the zoom lens system that includes, in order from the object along an optical axis, a first lens group having an optical path bending member for bending the optical path by substantially 90 degrees, a second lens group, a third lens group, and a fourth lens group; varying the focal length of the zoom lens system from a wide-angle end state to a telephoto end state by fixing the first lens group and the third lens group with respect to an image plane, moving the second lens group to the image plane, and moving the fourth lens group at first to the object and then to the image plane; and carrying out focusing from infinity to a close object by moving the fourth lens group along the optical axis in the wide-angle end state and the telephoto end state, and moving the second lens group along the optical axis in the other focal length states.

In the sixth aspect of the present invention, it is preferable to further comprise a step of: providing the first lens group having positive refractive power, the second lens group having negative refractive power, the third lens group having positive refractive power, and the fourth lens group having positive refractive power.

In the sixth aspect of the present invention, it is preferable to further comprise a step of: correcting an image blur on the image plane upon generating a camera shake by moving the third lens group in a direction perpendicular to the optical axis.

In the sixth aspect of the present invention, it is preferable to further comprise a step of: providing the third lens group that comprises, in order from the object along the optical axis, a positive lens and a cemented lens constructed by a positive lens cemented with a negative lens.

Other features and advantages according to the present invention will be readily understood from the detailed description of the preferred embodiments in conjunction with the accompanying drawings.

BRIEF DESCRIPTION OF THE DRAWINGS

FIGS. 1A and 1B are diagrams showing an electronic still camera which is an optical device equipped with a zoom lens system according to a first or second embodiment, in which FIG. 1A is a front view and FIG. 1B is a rear view.

FIGS. 4A and 4B are graphs showing various aberrations of the zoom lens system according to Example 1 in a wide-angle end state upon focusing on infinity in which FIG. 4A shows various aberrations without carrying out vibration reduction, and FIG. 4B shows coma upon carrying out vibration reduction.

FIGS. 5A and 5B are graphs showing various aberrations of the zoom lens system according to Example 1 in an intermediate focal length state upon focusing on infinity in which FIG. 5A shows various aberrations without carrying out vibration reduction, and FIG. 5B shows coma upon carrying out vibration reduction.

FIGS. 6A and 6B are graphs showing various aberrations of the zoom lens system according to Example 1 in a telephoto end state upon focusing on infinity, in which FIG. 6A shows various aberrations without carrying out vibration reduction, and FIG. 6B shows coma upon carrying out vibration reduction.

FIGS. 7A, 7B and 7C are graphs showing various aberrations of the zoom lens system according to Example 1 upon focusing on a shooting distance R=1500 mm, in which FIG. 7A shows various aberrations in the wide-angle end state, FIG. 7B shows various aberrations in the intermediate focal length state coma, and FIG. 7C shows various aberrations in the telephoto end state.

FIGS. 9A and 9B are graphs showing various aberrations of the zoom lens system according to Example 2 in a wide-angle end state upon focusing on infinity, in which FIG. 9A shows various aberrations without carrying out vibration reduction, and FIG. 9B shows coma upon carrying out vibration reduction.

FIGS. 10A and 10B are graphs showing various aberrations of the zoom lens system according to Example 2 in an intermediate focal length state upon focusing on infinity, in which FIG. 10A shows various aberrations without carrying out vibration reduction, and FIG. 10B shows coma upon carrying out vibration reduction.

FIGS. 11A and 11B are graphs showing various aberrations of the zoom lens system according to Example 2 in a telephoto end state upon focusing on infinity, in which FIG. 11A shows various aberrations without carrying out vibration reduction, and FIG. 11B shows coma upon carrying out vibration reduction.

FIGS. 12A, 12B and 12C are graphs showing various aberrations of the zoom lens system according to Example 2 upon focusing on a shooting distance R=1500 mm, in which FIG. 12A shows various aberrations in the wide-angle end state, FIG. 12B shows various aberrations in the intermediate focal length state coma, and FIG. 12C shows various aberrations in the telephoto end state.

FIGS. 14A and 14B are graphs showing various aberrations of the zoom lens system according to Example 3 in a wide-angle end state upon focusing on infinity, in which FIG. 14A shows various aberrations without carrying out vibration reduction, and FIG. 14B shows coma upon carrying out vibration reduction.

FIGS. 15A and 15B are graphs showing various aberrations of the zoom lens system according to Example 3 in an intermediate focal length state upon focusing on infinity, in which FIG. 15A shows various aberrations without carrying out vibration reduction, and FIG. 15B shows coma upon carrying out vibration reduction.

FIGS. 16A and 16B are graphs showing various aberrations of the zoom lens system according to Example 3 in a telephoto end state upon focusing on infinity, in which FIG. 16A shows various aberrations without carrying out vibration reduction, and FIG. 16B shows coma upon carrying out vibration reduction.

FIGS. 17A, 17B and 17C are graphs showing various aberrations of the zoom lens system according to Example 3 upon focusing on a shooting distance R=1500 mm, in which FIG. 17A shows various aberrations in the wide-angle end state, FIG. 17B shows various aberrations in the intermediate focal length state coma, and FIG. 17C shows various aberrations in the telephoto end state.

FIG. 18 is a diagram showing a lens configuration of a zoom lens system according to Example 4 of a second embodiment.

FIGS. 19A and 19B are graphs showing various aberrations of the zoom lens system according to Example 4 in a wide-angle end state upon focusing on infinity, in which FIG. 19A shows various aberrations without carrying out vibration reduction, and FIG. 19B shows coma upon carrying out vibration reduction.

FIGS. 20A and 20B are graphs showing various aberrations of the zoom lens system according to Example 4 in an intermediate focal length state upon focusing on infinity, in which FIG. 20A shows various aberrations without carrying out vibration reduction, and FIG. 20B shows coma upon carrying out vibration reduction.

FIGS. 21A and 21B are graphs showing various aberrations of the zoom lens system according to Example 4 in a telephoto end state upon focusing on infinity, in which FIG. 21A shows various aberrations without carrying out vibration reduction, and FIG. 21B shows coma upon carrying out vibration reduction.

FIGS. 22A and 22B are graphs showing various aberrations of the zoom lens system according to Example 4 in the wide-angle end state upon focusing on a shooting distance R=1500 mm, in which FIG. 22A shows various aberrations without carrying out vibration reduction, and FIG. 22B shows coma upon carrying out vibration reduction.

FIGS. 23A and 23B are graphs showing various aberrations of the zoom lens system according to Example 4 in the intermediate focal length state upon focusing on a shooting distance R=1500 mm, in which FIG. 23A shows various aberrations without carrying out vibration reduction, and FIG. 23B shows coma upon carrying out vibration reduction.

FIGS. 24A and 24B are graphs showing various aberrations of the zoom lens system according to Example 4 in the telephoto end state upon focusing on a shooting distance R=1500 mm, in which FIG. 24A shows various aberrations without carrying out vibration reduction, and FIG. 24B shows coma upon carrying out vibration reduction.

FIGS. 26A and 26B are graphs showing various aberrations of the zoom lens system according to Example 5 in a wide-angle end state upon focusing on infinity, in which FIG. 26A shows various aberrations without carrying out vibration reduction, and FIG. 26B shows coma upon carrying out vibration reduction.

FIGS. 27A and 27B are graphs showing various aberrations of the zoom lens system according to Example 5 in an intermediate focal length state upon focusing on infinity, in which FIG. 27A shows various aberrations without carrying out vibration reduction, and FIG. 27B shows coma upon carrying out vibration reduction.

FIGS. 28A and 28B are graphs showing various aberrations of the zoom lens system according to Example 5 in a telephoto end state upon focusing on infinity, in which FIG. 28A shows various aberrations without carrying out vibration reduction, and FIG. 28B shows coma upon carrying out vibration reduction.

FIGS. 29A and 29B are graphs showing various aberrations of the zoom lens system according to Example 5 in the wide-angle end state upon focusing on a shooting distance R=1500 mm, in which FIG. 29A shows various aberrations without carrying out vibration reduction, and FIG. 29B shows coma upon carrying out vibration reduction.

FIGS. 30A and 30B are graphs showing various aberrations of the zoom lens system according to Example 5 in the intermediate focal length state upon focusing on a shooting distance R=1500 mm, in which FIG. 30A shows various aberrations without carrying out vibration reduction, and FIG. 30B shows coma upon carrying out vibration reduction.

FIGS. 31A and 31B are graphs showing various aberrations of the zoom lens system according to Example 5 in the telephoto end state upon focusing on a shooting distance R=1500 mm, in which FIG. 31A shows various aberrations without carrying out vibration reduction, and FIG. 31B shows coma upon carrying out vibration reduction.

FIG. 32 is a diagram showing a lens configuration of a zoom lens system according to Example 6 of the second embodiment.

FIGS. 33A and 33B are graphs showing various aberrations of the zoom lens system according to Example 6 in a wide-angle end state upon focusing on infinity, in which FIG. 33A shows various aberrations without carrying out vibration reduction, and FIG. 33B shows coma upon carrying out vibration reduction.

FIGS. 34A and 34B are graphs showing various aberrations of the zoom lens system according to Example 6 in an intermediate focal length state upon focusing on infinity, in which FIG. 34A shows various aberrations without carrying out vibration reduction, and FIG. 34B shows coma upon carrying out vibration reduction.

FIGS. 35A and 35B are graphs showing various aberrations of the zoom lens system according to Example 6 in a telephoto end state upon focusing on infinity, in which FIG. 35A shows various aberrations without carrying out vibration reduction, and FIG. 35B shows coma upon carrying out vibration reduction.

FIGS. 36A and 36B are graphs showing various aberrations of the zoom lens system according to Example 6 in the wide-angle end state upon focusing on a shooting distance R=1500 mm, in which FIG. 36A shows various aberrations without carrying out vibration reduction, and FIG. 36B shows coma upon carrying out vibration reduction.

FIGS. 37A and 37B are graphs showing various aberrations of the zoom lens system according to Example 6 in the intermediate focal length state upon focusing on a shooting distance R=1500 mm, in which FIG. 37A shows various aberrations without carrying out vibration reduction, and FIG. 37B shows coma upon carrying out vibration reduction.

FIGS. 38A and 38B are graphs showing various aberrations of the zoom lens system according to Example 6 in the telephoto end state upon focusing on a shooting distance R=1500 mm, in which FIG. 38A shows various aberrations without carrying out vibration reduction, and FIG. 38B shows coma upon carrying out vibration reduction.

DESCRIPTION OF THE MOST PREFERRED EMBODIMENT

Examples according to first and second embodiments are explained below.

Figure 1A:
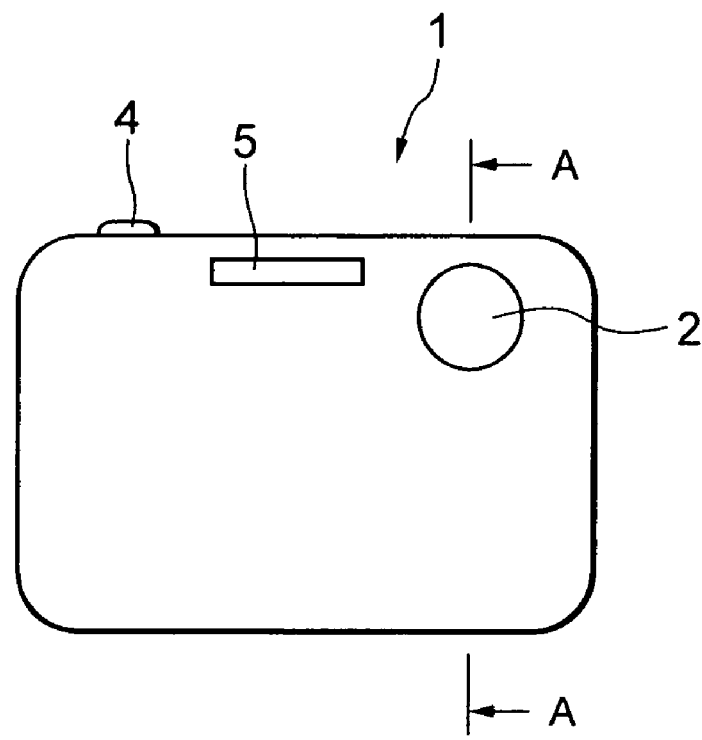
Figure 1B:
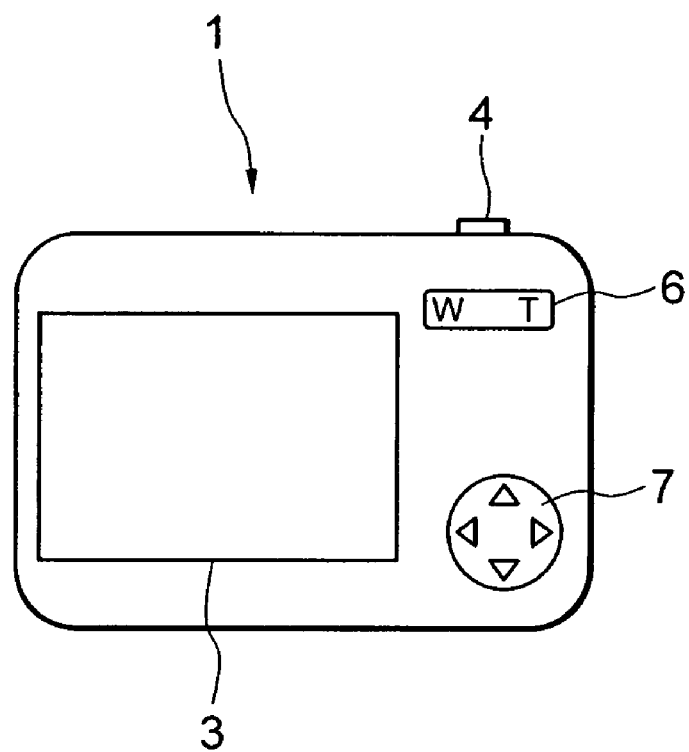
Figure 2:
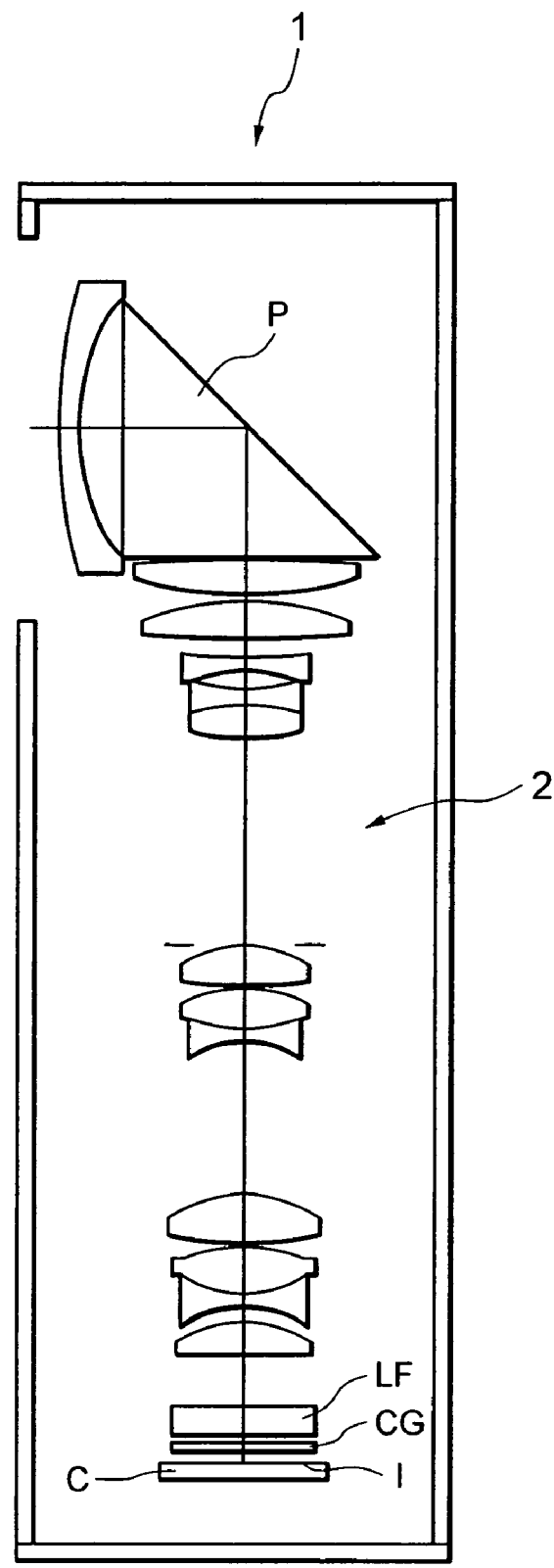
FIG. 2 is a cross-sectional view along the A-A line in FIG. 1A and schematically showing an arrangement of the zoom lens system according to the present embodiments.

FIGS. 1A and 1B are diagrams showing an electronic still camera which is an optical device equipped with a zoom lens system according to either of a first and second embodiments, in which FIG. 1A is a front view and FIG. 1B is a rear view. FIG. 2 is a cross-sectional view along the A-A line in FIG. 1A and schematically showing an arrangement of the zoom lens system according to either of the present embodiments.

In an electronic still camera 1 according to either of the present embodiments shown in FIGS. 1 and 2, when a power switch button (not shown) is pressed, a shutter (not shown) is opened and light from a subject (not shown) is collected by a shooting lens 2 and an image is formed on an imaging device C disposed on an image plane I. The subject image formed on the imaging device C is displayed on a liquid crystal monitor 3 disposed backside of the electronic still camera 1. After fixing the composition of the subject image with observing the liquid crystal monitor 3, a photographer presses a release button 4 to shoot the subject image by the imaging device C, and stores in a memory (not shown).

The shooting lens 2 is composed of a zoom lens system 2 according to either of the present embodiments explained later. Since the light incident on the front side of the electronic still camera 1 is deflected by substantially 90 degrees downward (downward in FIG. 2) by a prism P in the zoom lens system 2 explained later, the electronic still camera 1 can be composed to be thinner.

Moreover, in the electronic still camera 1, there are disposed such as an auxiliary light emitter 5 that emits auxiliary light when the subject is dark, a W-T button 6 that makes the zoom lens system 2, which is the shooting lens 2, zoom from a wide-angle end state (W) to a telephoto end state (T), and an action button 7 that is used for setting various conditions of the electronic still camera 1.

In this manner, the electronic still camera 1 which is the optical device equipped with the zoom lens system 2 according to either of the present embodiments explained later is composed.

First Embodiment

A zoom lens system according to a first embodiment is explained.

A zoom lens system according to the first embodiment is composed of, in order from an object, a first lens group having positive refractive power and an optical path bending member for bending the optical path by substantially 90 degrees, a second lens group having negative refractive power, a third lens group having positive refractive power, and a fourth lens group having positive refractive power. When the focal length varies from a wide-angle end state to a telephoto end state, which is called as zooming, the first lens group and the third lens group are fixed with respect to an image plane, the second lens group is moved to the image, and the fourth lens group is moved at first to the object and then to the image plane such that a distance between the first lens group and the second lens group increases, and a distance between the second lens group and the third lens group decreases. Upon generating a camera shake, an image blur is corrected by moving the third lens group in a direction perpendicular to the optical axis.

With such configuration, it becomes possible to provide a zoom lens system having a vibration reduction function, and an ultra-compactness, suitable for an optical device such as a compact video camera, an electronic still camera, and the like using a solid-state imaging device.

The first lens group disposed to the most object side is always fixed upon zooming from the wide-angle end state to the telephoto end state and focusing, so that the first lens group which is the largest lens group in the zoom lens system is not necessary to move. Accordingly, the driving mechanism can be simple.

Since zooming is carried out by lens groups except the first lens group that is the largest lens group, it becomes possible to use a smaller driving mechanism than the one used to be used.

Moreover, the third lens group is fixed upon zooming and is shifted in the direction substantially perpendicular to the optical axis to correct an image blur on the image plane upon generating a camera shake. With introducing a mechanism that shifts the third lens group having the smallest effective diameter in the zoom lens system in the direction substantially perpendicular to the optical axis, it becomes possible to suppress deterioration in optical performance upon shifting the third lens group to be minimum. Moreover, it becomes possible to shift the third lens group with a driving system having a minute torque, so that the whole camera system can be compact. Furthermore, since the moving amount of the image on the image plane is large upon shifting the third lens group, the shift amount of the third lens group can be small upon correcting the image blur.

Upon zooming from the wide-angle end state to the telephoto end state, the first lens group and the third lens group are fixed with respect to the image plane, the second lens group is moved to the image plane, the fourth lens group is moved at first to the object and then to the image plane such that a distance between the first lens group and the second lens group increases, and a distance between the second lens group and the third lens group decreases. In particular, the fourth lens group moves such that a distance between the third lens group and the fourth lens group decreases from the wide-angle end state to a given focal length state. From the given focal length state to the telephoto end state, the fourth lens group is moved to the image plane so as to increase the distance. With constructing the zoom lens system such a manner, it becomes possible to secure a moving space for the focusing lens group in the telephoto end state.

Moreover, in the zoom lens system according to the first embodiment, it is preferable that the third lens group is composed of, in order from the object along the optical axis, a positive lens, and a cemented lens constructed by a positive lens cemented with a negative lens.

With constructing in this manner, it becomes possible to excellently correct various basic aberrations produced in the third lens group. Moreover, by shifting the third lens group in the direction substantially perpendicular to the optical axis, it becomes possible to suppress variation in coma when correcting the image blur on the image plane upon generating a camera shake. On the other hand, when the third lens group is composed of, in order from the object, a positive lens, and a cemented lens constructed by a negative lens cemented with a positive lens, it becomes difficult to excellently correct aberrations such as coma upon correcting the image blur and to secure the vibration reduction function in a sophisticated state, so that it is undesirable.

Moreover, in the zoom lens system according to the first embodiment, it is preferable that the fourth lens group is composed of, in order from the object along the optical axis, a positive lens, a cemented lens constructed by a positive lens cemented with a negative lens, and a positive lens.

With constructing in this manner, it becomes possible to excellently correct variation in coma upon zooming such that the fourth lens group is moved to the object from the wide-angle end state to a given focal length state so as to decrease a distance between the third lens group and the fourth lens group, and moved to the image from the given focal length state to the telephoto end state so as to increase the distance.

Moreover, in the zoom lens system according to the first embodiment, it is preferable that the first lens group is composed of, in order from the object along the optical axis, a negative lens, an optical path bending member, a positive lens, and a positive lens.

With constructing in this manner, it becomes possible to excellently correct astigmatism and coma produced in the first lens group. Moreover, it becomes possible to correct variation in coma upon correcting the image blur by the third lens group.

Moreover, in the zoom lens system according to the first embodiment, it is preferable that each lens group from the first lens group to the fourth lens group has at least one aspherical lens. With disposing an aspherical lens in each lens group so as to correct various aberrations produced in each lens group, it becomes possible to reduce variation in various aberrations upon zooming and focusing.

Moreover, in the zoom lens system according to the first embodiment, it is preferable that a rectangular prism is used as the optical path bending member. The rectangular prism can deflect the optical path by a total internal reflection, reduce the loss of the light amount, and make the optical system compact. Incidentally, a mirror or an optical fiber may be used as the optical path bending member except the rectangular prism.

Moreover, in the zoom lens system according to the first embodiment, it is preferable that focusing from infinity to a close object is carried out by moving the fourth lens group along the optical axis to the object. With making the fourth lens group as a focusing lens group, it becomes possible to reduce the moving amount upon focusing, so that the dimension of the whole zoom lens system can be compact. Moreover, it becomes possible to excellently correct variation in coma upon focusing.

Furthermore, a method for correcting an image blur of a zoom lens system according to the first embodiment is as follows: the zoom lens system includes, in order from the object, a first lens group having positive refractive power and an optical path bending member for bending the optical path by substantially 90 degrees, a second lens group having negative refractive power, a third lens group having positive refractive power, and a fourth lens group having positive refractive power; when a focal length of the zoom lens system varies from a wide-angle end state to a telephoto end state, the first lens group and the third lens group are fixed with respect to the image plane, the second lens group is moved to the image plane, and the fourth lens group is moved at first to the object and then to the image plane; the method is carried out by moving the third lens group in a direction perpendicular to the optical axis.

With introducing the method for correcting an image blur that the third lens group which has the smallest effective diameter in the optical system is shifted in the direction substantially perpendicular to the optical axis, it becomes possible to suppress deterioration in optical performance upon shifting the third lens group to be minimum. Moreover, it becomes possible to shift the third lens group with a driving system having a minute torque, so that the whole camera system can be compact. Furthermore, since the moving amount of the image on the image plane is large upon shifting the third lens group, the shift amount of the third lens group can be small upon correcting the image blur.

Furthermore, a method for varying a focal length of the zoom lens system according to the first embodiment is as follows: the zoom lens system includes, in order from the object, a first lens group having positive refractive power and an optical path bending member for bending the optical path by substantially 90 degrees, a second lens group having negative refractive power, a third lens group having positive refractive power, and a fourth lens group having positive refractive power; an image blur on the image plane generated upon a camera shake is corrected by moving the third lens group in the direction perpendicular to the optical axis; the method is carried out such that when a focal length of the zoom lens system varies from a wide-angle end state to a telephoto end state, the first lens group and the third lens group are fixed with respect to the image plane, the second lens group is moved to the image plane, and the fourth lens group is moved at first to the object and then to the image plane.

With introducing the method for varying the focal length, it becomes possible to secure the moving space for the focusing lens in the telephoto end state. Moreover, it becomes possible to excellently correct astigmatism and coma upon zooming.

Furthermore, a method for focusing of a zoom lens system according to the first embodiment is as follows: the zoom lens system includes, in order from the object along an optical axis, a first lens group having positive refractive power and an optical path bending member for bending the optical path by substantially 90 degrees, a second lens group having negative refractive power, a third lens group having positive refractive power, and a fourth lens group having positive refractive power; when a focal length of the zoom lens system varies from a wide-angle end state to a telephoto end state, the first lens group and the third lens group are fixed with respect to the image plane, the second lens group is moved to the image plane, and the fourth lens group is moved at first to the object and then to the image plane; an image blur on the image plane generated upon a camera shake is corrected by moving the third lens group in the direction perpendicular to the optical axis; and the method for focusing from infinity to a close object is carried out by moving the fourth lens group along the optical axis.

With introducing the method for focusing from infinity to a close object by moving the fourth lens group along the optical axis, it becomes possible to reduce the moving amount upon focusing. The driving mechanism for the focusing lens group becomes simple, so that the dimension of the whole zoom lens system can be compact. Moreover, it becomes possible to excellently correct variation in coma upon focusing.

Furthermore, at least one plastic lens can be used in each lens group. With using plastic lenses in this manner, it becomes possible to realize further reduction of manufacturing cost and the weight thereof. In addition, the zoom lens system according to the first embodiment can be used for an optical system of an optical device except camera such as an optical measuring device and an endoscope.

Each example of the zoom lens system according to the first embodiment is explained below with reference to accompanying drawings.

EXAMPLE 1

Figure 3:
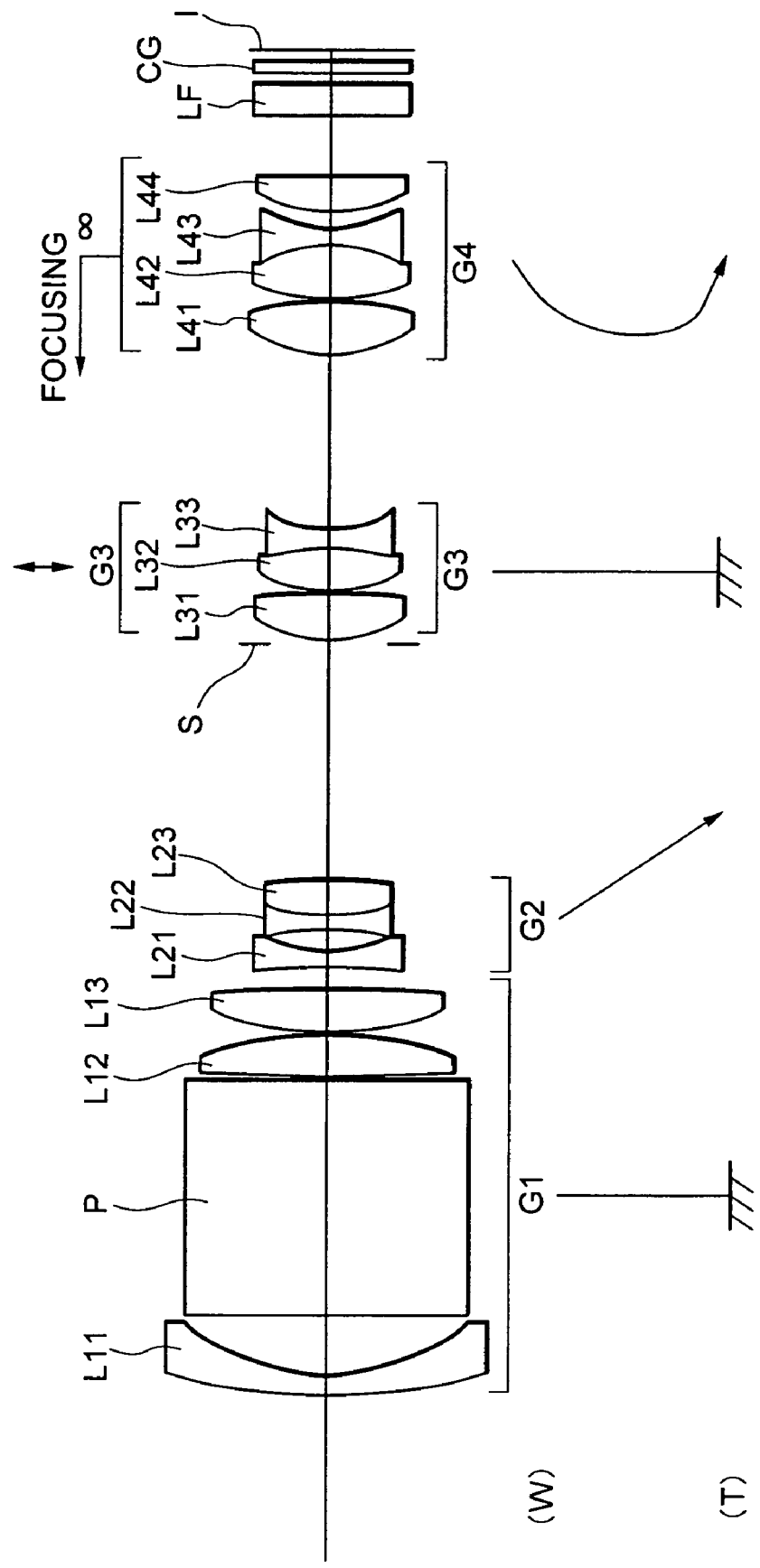
FIG. 3 is a diagram showing a lens configuration of a zoom lens system according to Example 1 of the first embodiment.

FIG. 3 is a diagram showing a lens configuration of a zoom lens system according to Example 1 of the first embodiment. Although the zoom lens system according to Example 1 deflects its optical path by 90 degrees as shown in FIG. 2, the optical path is extended in FIG. 3.

In FIG. 3, the zoom lens system according to Example 1 is composed of, in order from an object, a first lens group G1 having positive refractive power and a rectangular prism P for bending the optical path by 90 degrees, the second lens group G2 having negative refractive power, a third lens group G3 having positive refractive power, and a fourth lens group G4 having positive refractive power. When the focal length varies from a wide-angle end state W to a telephoto end state T, the first lens group G1 and the third lens group G3 are fixed with respect to the image plane I, the second lens group G2 is moved to the image plane I, and the fourth lens group G4 is moved at first to the object and then to the image plane I such that a distance between the first lens group G1 and the second lens group G2 increases, and a distance between the second lens group G2 and the third lens group G3 decreases.

The first lens group G1 is composed of, in order from the object along the optical axis, a negative meniscus lens L11 having a convex surface facing the object, a rectangular prism P for bending the optical path by 90 degrees, a double convex positive lens L12, and a double convex positive lens L13.

The second lens group G2 is composed of, in order from the object along the optical axis, a double concave negative lens L21, and a cemented lens constructed by a double concave negative lens L22 cemented with a double convex positive lens L23.

The third lens group G3 is composed of, in order from the object along the optical axis, a double convex positive lens L31, and a cemented lens constructed by a double convex positive lens L32 cemented with a double concave negative lens L33. An image blur on the image plane I upon generating a camera shake is corrected by shifting the third lens group G3 in the direction substantially perpendicular to the optical axis.

An aperture stop S is disposed in the vicinity of the most object side lens of the third lens group G3 and fixed upon zooming from the wide-angle end state W to the telephoto end state T.

The fourth lens group G4 is composed of, in order from the object along the optical axis, a double convex positive lens L41, a cemented lens constructed by a double convex positive lens L42 cemented with a double concave negative lens L43, and a positive meniscus lens L44 having a convex surface facing the object. Focusing from the infinity to a close object is carried out by moving the fourth lens group G4 along the optical axis to the object.

Between the fourth lens group G4 and the image plane I, there are provided a low pass filter LF for blocking spatial frequency higher than the resolution limit of the solid-state imaging device such as a CCD, and a cover glass CG for protecting the solid-state imaging device.

Various values associated with Example 1 are listed in Table 1. In [Specifications], f denotes a focal length, Bf denotes a back focal length, FNO denotes an f-number, and ω denotes a half angle of view (unit: degree). In [Lens Data], the left most column shows the lens surface number counted in order from the object side, the second column "r" shows a radius of curvature of the lens surface, the third column "d" shows a distance to the next lens surface, the fourth column "vd" shows Abbe number of the medium at d-line (wave length λ=587.6 nm), and the fifth column "nd" shows refractive index of the medium at d-line. Refractive index of the air nd=1.0000 is omitted. Here, "r=∞" denotes a plane surface. In the surface number 3 to 6 corresponding to the rectangular prism P, the surface number 3 denotes an entrance surface, the surface number 6 denotes an exit surface, and the surface numbers 4 and 5 denote imaginary surfaces corresponding to the reflection surface. In [Aspherical Surface Data], a conical coefficient κ and i-th order aspherical coefficient Ci expressed by the following expression are shown:

$$X(y)=y^2/[r\times\{1+(1-\kappa y^2/r^2)^{1/2}\}]+C4\times y^4+C6\times y^6+C8\times y^8+C10\times y^{10}$$

where y denotes a height from the optical axis, X(y) denotes a distance along the optical axis from tangent plane at the vertex of the aspherical surface to the aspherical surface at the height y, r denotes a radius of curvature of a reference sphere (paraxial radius of curvature), κ denotes a conical coefficient, and Ci denotes i-th order aspherical coefficient, respectively. An aspherical surface is denoted by an asterisk (*) attached to the surface number in [Lens Data]. Refractive index of the air 1.00000 is omitted. In [Zooming Data], focal lengths and variable distances with respect to the wide-angle end state W, intermediate focal length state M, and the telephoto end state T are shown. In [Focusing Data], shooting distance D0 and variable distances with respect to the wide-angle end state W, intermediate focal length state M, and the telephoto end state T are shown.

In the tables for various values, "mm" is generally used for the unit of length such as the focal length, the radius of curvature and the distance to the next lens surface. However, since an optical system proportionally enlarged or reduced its dimension can be obtained similar optical performance, the unit is not necessary to be limited to "mm", and any other suitable unit can be used.

The explanation of reference symbols is the same in the other Examples.

TABLE 1

| [Specifications] | | | |
|---|---|---|---|
| | W | M | T |
| f = | 6.51 | 18.81 | 30.72 |
| FNO = | 3.67 | 4.68 | 4.55 |
| ω = | 31.67 | 11.11 | 6.83° |
| Bf = | 0.70 | | |

| [Lens Data] | | | |
|---|---|---|---|
| | r | d | vd | nd |
| 1) | 34.0078 | 1.0000 | 23.78 | 1.846660 |
| 2) | 11.9200 | 3.0000 | | |
| 3) | ∞ | 6.0000 | 46.57 | 1.804000 |
| 4) | ∞ | 0.0000 | 46.57 | 1.804000 |
| 5) | ∞ | 6.0000 | 46.57 | 1.804000 |
| 6) | ∞ | 0.2000 | | |
| 7) | 172.9183 | 2.1000 | 58.19 | 1.622630 |
| *8) | −21.5758 | 0.2000 | | |
| 9) | 16.2691 | 2.2000 | 82.56 | 1.497820 |
| 10) | −78.0069 | (D1) | | |

TABLE 1-continued

| | | | | |
|---|---|---|---|---|
| 11) | −29.6692 | 0.8000 | 42.71 | 1.820800 |
| *12) | 9.2335 | 1.1500 | | |
| 13) | −9.3606 | 0.8000 | 52.32 | 1.754998 |
| 14) | 10.5270 | 1.8000 | 23.78 | 1.846660 |
| 15) | −21.0946 | (D2) | | |
| 16> | ∞ | 0.2000 | Aperture Stop S | |
| 17) | 7.5249 | 2.2000 | 58.19 | 1.622630 |
| *18) | −33.6584 | 0.2000 | | |
| 19) | 7.1581 | 2.3000 | 65.44 | 1.603001 |
| 20) | −8.4228 | 0.8000 | 40.76 | 1.882997 |
| 21) | 5.4883 | (D3) | | |
| 22) | 7.4598 | 2.7000 | 64.06 | 1.516330 |
| *23) | −19.5058 | 0.2000 | | |
| 24) | 10.6948 | 2.8000 | 82.56 | 1.497820 |
| 25) | −7.0556 | 0.8000 | 40.76 | 1.882997 |
| 26) | 7.1661 | 0.9000 | | |
| 27) | 8.2394 | 1.8000 | 70.23 | 1.487490 |
| 28) | 541.6317 | (D4) | | |
| 29) | ∞ | 1.6500 | 70.51 | 1.544370 |
| 30) | ∞ | 0.5000 | | |
| 31) | ∞ | 0.5000 | 64.14 | 1.516330 |
| 32) | ∞ | (Bf) | | |

[Aspherical Surface Data]

Surface number: 8 k = +2.9632
C4 = +1.55230E−05
C6 = −6.51240E−09
C8 = +2.18230E−09
C10 = −3.24580E−11

Surface number: 12 k = −2.1186
C4 = +4.03570E−04
C6 = −1.33380E−06
C8 = 0.00000E+00
C10 = 0.00000E+00

Surface number: 18 k = −12.3215
C4 = +5.92900E−05
C6 = −7.12220E−07
C8 = −8.69530E−08
C10 = 0.00000E+00

Surface number: 23 k = −69.5236
C4 = −1.02210E−03
C6 = +7.43260E−05
C8 = −3.61680E−06
C10 = +7.49980E−08

| | W | M | T |
|---|---|---|---|
| | [Zooming Data] | | |
| f | 6.51005 | 18.81000 | 30.71656 |
| D1 | 1.19992 | 8.62300 | 12.28629 |
| D2 | 12.28640 | 4.86332 | 1.19995 |
| D3 | 8.98717 | 3.47774 | 3.98915 |
| D4 | 2.98109 | 8.49052 | 7.97915 |
| | [Focusing Data] | | |
| D0 | 1500.00000 | 1500.00000 | 1500.00000 |
| D1 | 1.19992 | 8.62300 | 12.28629 |
| D2 | 12.28640 | 4.86332 | 1.19995 |
| D3 | 8.95866 | 3.23098 | 3.32420 |
| D4 | 3.00960 | 8.73728 | 8.64410 |

Figure 5A:
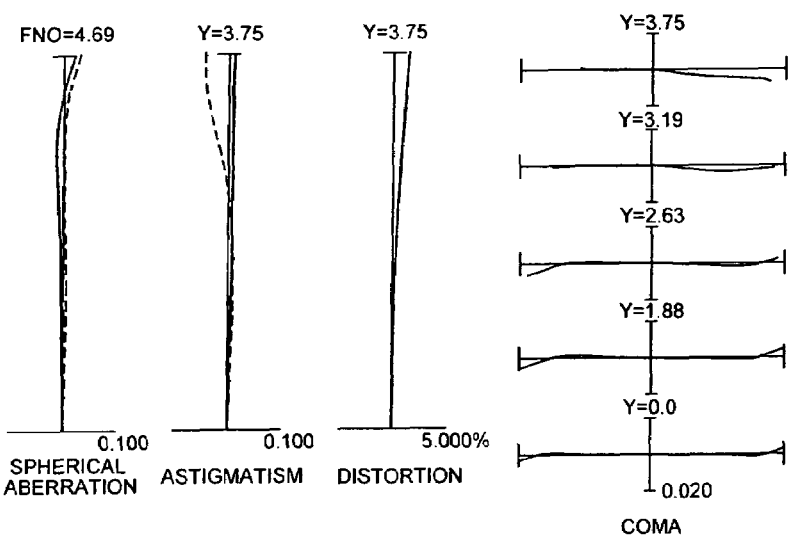
Figure 5B:
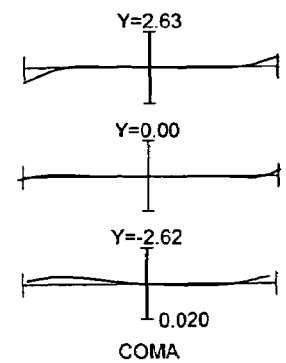
Figure 6A:
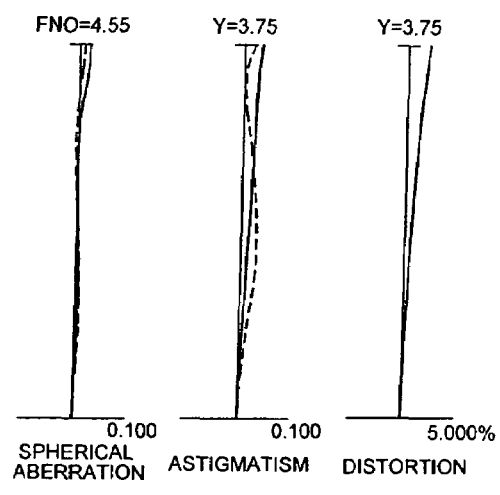
Figure 6B:
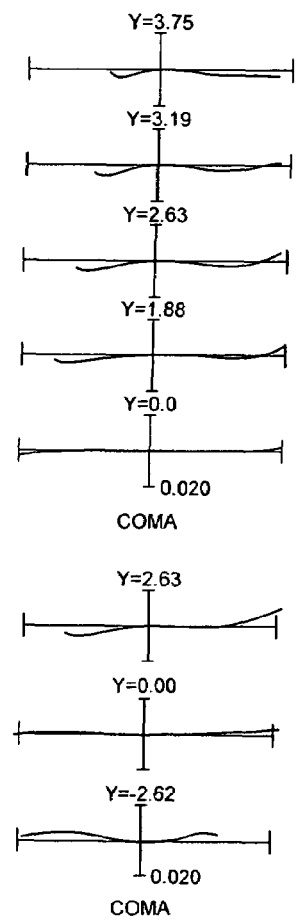
Figure 7A:
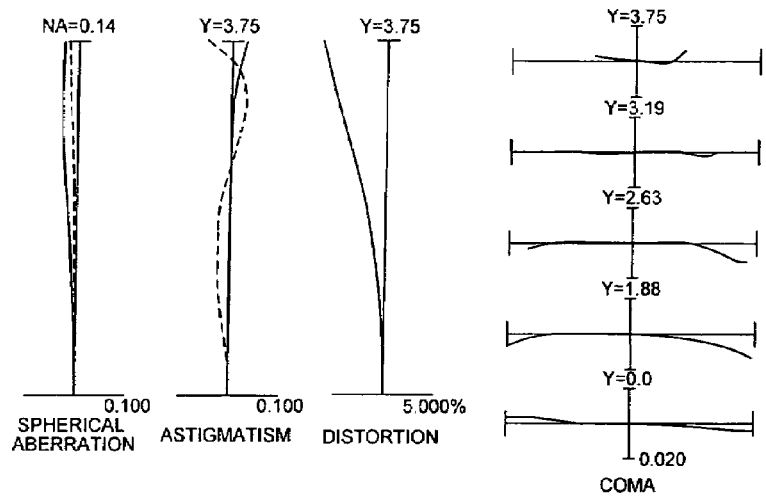
Figure 7B:
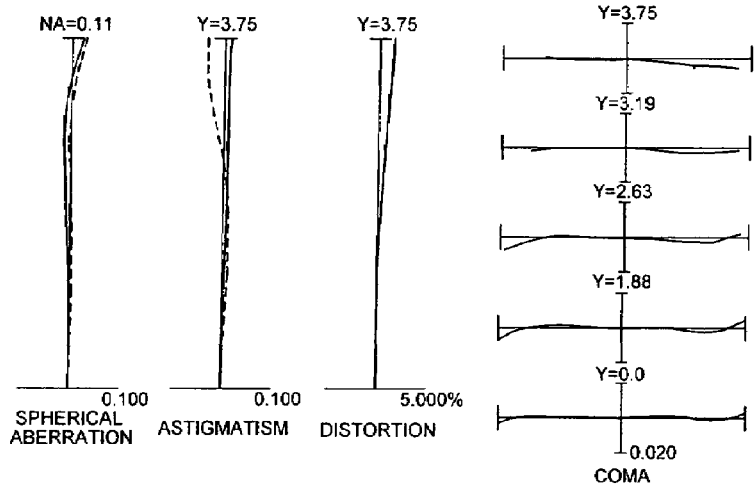
Figure 7C:
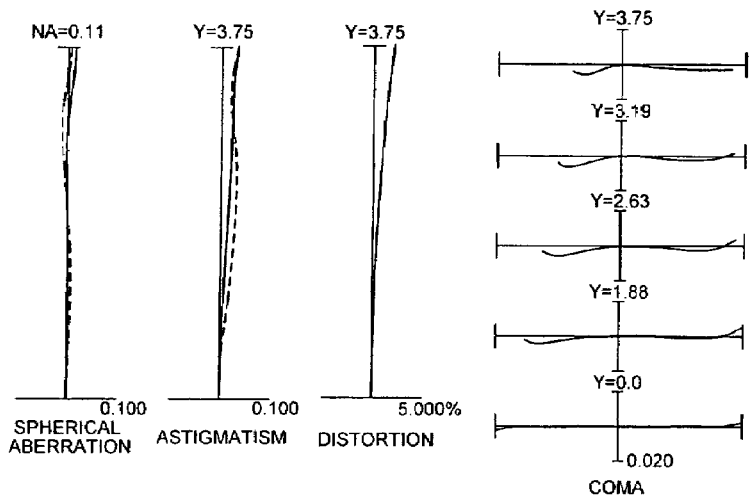

FIGS. 4A and 4B are graphs showing various aberrations of the zoom lens system according to Example 1 in a wide-angle end state upon focusing on infinity in which FIG. 4A shows various aberrations without carrying out vibration reduction, and FIG. 4B shows coma upon carrying out vibration reduction. FIGS. 5A and 5B are graphs showing various aberrations of the zoom lens system according to Example 1 in an intermediate focal length state upon focusing on infinity in which FIG. 5A shows various aberrations without carrying out vibration reduction, and FIG. 5B shows coma upon carrying out vibration reduction. FIGS. 6A and 6B are graphs showing various aberrations of the zoom lens system according to Example 1 in a telephoto end state upon focusing on infinity, in which FIG. 6A shows various aberrations without carrying out vibration reduction, and FIG. 6B shows coma upon carrying out vibration reduction. FIGS. 7A, 7B and 7C are graphs showing various aberrations of the zoom lens system according to Example 1 upon focusing on a shooting distance R=1500 mm, in which FIG. 7A shows various aberrations in the wide-angle end state, FIG. 7B shows various aberrations in the intermediate focal length state coma, and FIG. 7C shows various aberrations in the telephoto end state.

In respective graphs, FNO denotes an f-number, NA denotes a numerical aperture, Y denotes an image height. In the graph showing astigmatism, a solid line indicates a sagittal image plane, and a broken line indicates a meridional image plane. Various aberrations are shown at d-line (587.6 nm). The above-described explanation regarding various aberration graphs is the same as the other examples, and the duplicated explanations are omitted.

As is apparent from the respective graphs, the zoom lens system according to Example 1 shows superb optical performance as a result of good corrections to various aberrations in each focal length state from the wide-angle end state to the telephoto end state.

EXAMPLE 2

Figure 8:
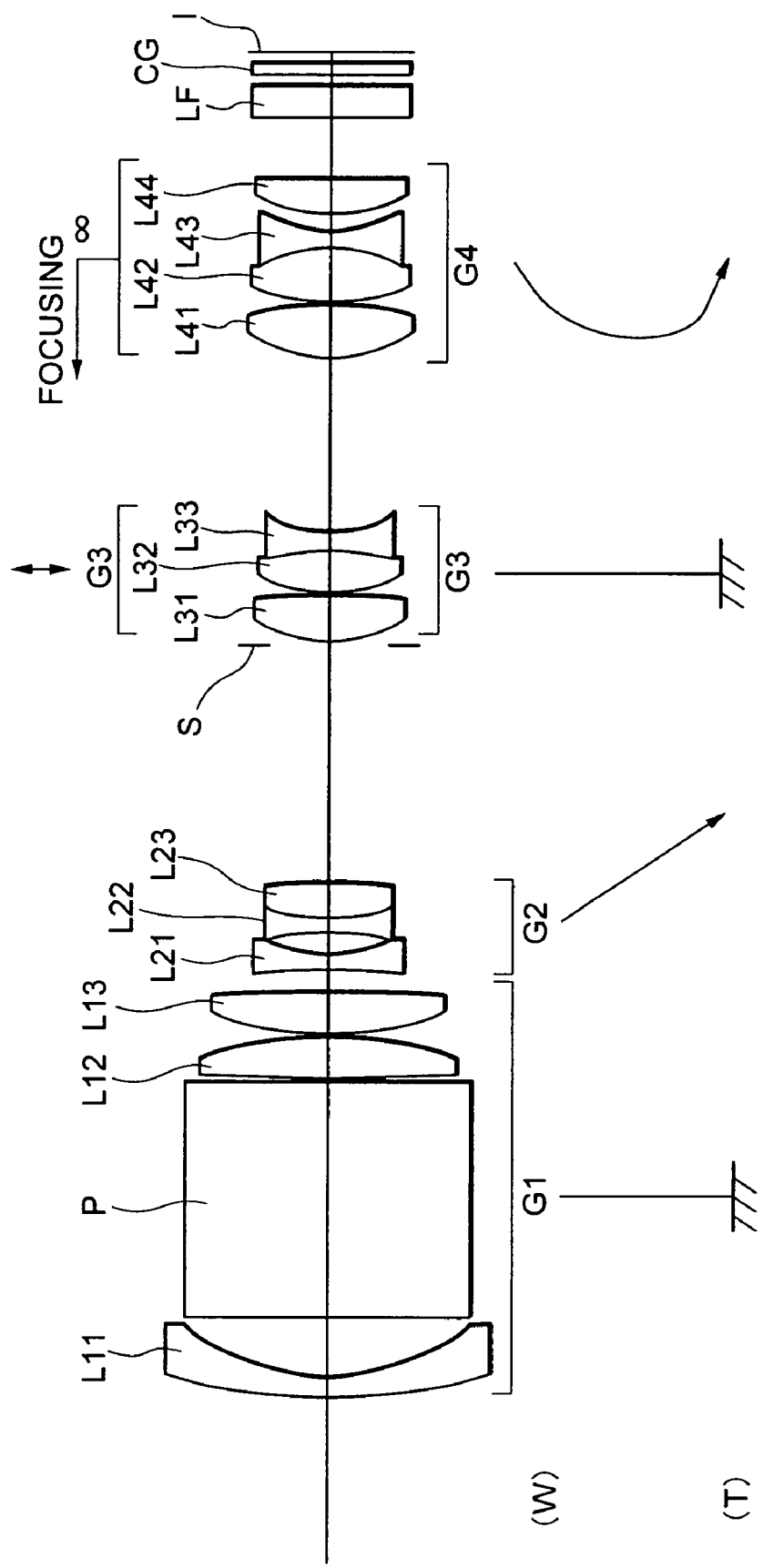
FIG. 8 is a diagram showing a lens configuration of a zoom lens system according to Example 2 of the first embodiment.

FIG. 8 is a diagram showing a lens configuration of a zoom lens system according to Example 2 of the first embodiment. Although the zoom lens system according to Example 2 deflects its optical path by 90 degrees as shown in FIG. 2, the optical path is extended in FIG. 8.

In FIG. 8, the zoom lens system according to Example 2 is composed of, in order from an object, a first lens group G1 having positive refractive power and a rectangular prism P for bending the optical path by 90 degrees, the second lens group G2 having negative refractive power, a third lens group G3 having positive refractive power, and a fourth lens group G4 having positive refractive power. When the focal length varies from a wide-angle end state W to a telephoto end state T, the first lens group G1 and the third lens group G3 are fixed with respect to the image plane I, the second lens group G2 is moved to the image plane I, and the fourth lens group G4 is moved at first to the object and then to the image plane I such that a distance between the first lens group G1 and the second lens group G2 increases, and a distance between the second lens group G2 and the third lens group G3 decreases.

The first lens group G1 is composed of, in order from the object along the optical axis, a negative meniscus lens L11 having a convex surface facing the object, a rectangular prism P for bending the optical path by 90 degrees, a double convex positive lens L12, and a double convex positive lens L13.

The second lens group G2 is composed of, in order from the object along the optical axis, a double concave negative lens L21, and a cemented lens constructed by a double concave negative lens L22 cemented with a double convex positive lens L23.

The third lens group G3 is composed of, in order from the object along the optical axis, a double convex positive lens L31, and a cemented lens constructed by a double convex positive lens L32 cemented with a double concave negative lens L33. An image blur on the image plane I upon generating a camera shake is corrected by shifting the third lens group G3 in the direction substantially perpendicular to the optical axis.

An aperture stop S is disposed in the vicinity of the most object side lens of the third lens group G3 and fixed upon zooming from the wide-angle end state W to the telephoto end state T.

The fourth lens group G4 is composed of, in order from the object along the optical axis, a double convex positive lens L41, a cemented lens constructed by a double convex positive lens L42 cemented with a double concave negative lens L43, and a positive meniscus lens L44 having a convex surface facing the object. Focusing from the infinity to a close object is carried out by moving the fourth lens group G4 along the optical axis to the object.

Between the fourth lens group G4 and the image plane I, there are provided a low pass filter LF for blocking spatial frequency higher than the resolution limit of the solid-state imaging device such as a CCD, and a cover glass CG for protecting the solid-state imaging device.

Various values associated with Example 2 are listed in Table 2.

TABLE 2

[Specifications]

| | W | M | T |
|---|---|---|---|
| f = | 6.51 | 17.75 | 30.72 |
| FNO = | 3.60 | 4.53 | 4.47 |
| ω = | 31.67 | 11.76 | 6.83° |
| Bf = | 0.70 | | |

[Lens Data]

| | r | d | νd | nd |
|---|---|---|---|---|
| 1) | 31.1465 | 1.0000 | 23.78 | 1.846660 |
| 2) | 11.5504 | 3.0000 | | |
| 3) | ∞ | 6.0000 | 46.57 | 1.804000 |
| 4) | ∞ | 0.0000 | 46.57 | 1.804000 |
| 5) | ∞ | 6.0000 | 46.57 | 1.804000 |
| 6) | ∞ | 0.2000 | | |
| 7) | 264.1434 | 2.1000 | 58.19 | 1.622630 |
| *8) | −20.7136 | 0.2000 | | |
| 9) | 16.0315 | 2.2000 | 82.56 | 1.497820 |
| 10) | −85.2611 | (D1) | | |
| 11) | −25.3286 | 0.8000 | 42.71 | 1.820800 |
| *12) | 9.4152 | 1.1000 | | |
| 13) | −9.9778 | 0.8000 | 52.32 | 1.754998 |
| 14) | 10.3391 | 1.8000 | 23.78 | 1.846660 |
| 15) | −22.0842 | (D2) | | |
| 16> | ∞ | 0.2000 | Aperture Stop S | |
| 17) | 7.5735 | 2.2000 | 58.19 | 1.622630 |
| *18) | −33.3358 | 0.2000 | | |
| 19) | 7.1359 | 2.3000 | 65.44 | 1.603001 |
| 20) | −8.5676 | 0.8000 | 40.76 | 1.882997 |
| 21) | 5.4802 | (D3) | | |
| 22) | 7.4365 | 2.7000 | 64.06 | 1.516330 |
| *23) | −19.2699 | 0.2000 | | |
| 24) | 11.1202 | 2.8000 | 82.56 | 1.497820 |
| 25) | −6.9958 | 0.8000 | 40.76 | 1.882997 |
| 26) | 7.4978 | 0.9000 | | |
| 27) | 8.6160 | 1.8000 | 70.23 | 1.487490 |
| 28) | 466.7448 | (D4) | | |
| 29) | ∞ | 1.6500 | 70.51 | 1.544370 |
| 30) | ∞ | 0.5000 | | |
| 31) | ∞ | 0.5000 | 64.14 | 1.516330 |
| 32) | ∞ | (Bf) | | |

[Aspherical Surface Data]

Surface number: 8

$k = +3.5552$
$C4 = +2.46240E{-}05$

TABLE 2-continued $C6 = +1.15750E{-}07$
$C8 = +9.22190E{-}10$
$C10 = -5.36320E{-}12$ Surface number: 12

$k = -1.9594$
$C4 = +3.27520E{-}04$
$C6 = 0.00000E{+}00$
$C8 = 0.00000E{+}00$
$C10 = 0.00000E{+}00$

Surface number: 18

$k = -12.3650$
$C4 = +6.27710E{-}05$
$C6 = -1.84810E{-}06$
$C8 = -1.93740E{-}08$
$C10 = 0.00000E{+}00$

Surface number: 23

$k = -69.5093$
$C4 = -1.04130E{-}03$
$C6 = +7.50630E{-}05$
$C8 = -3.53900E{-}06$
$C10 = +7.10820E{-}08$

| | W | M | T |
|---|---|---|---|
| | [Zooming Data] | | |
| f | 6.51005 | 17.75126 | 30.71656 |
| D1 | 1.20070 | 8.28330 | 12.28707 |
| D2 | 12.28671 | 5.20438 | 1.20026 |
| D3 | 8.98726 | 3.72651 | 3.98924 |
| D4 | 2.99322 | 8.25388 | 7.99128 |
| | [Focusing Data] | | |
| D0 | 1500.00000 | 1500.00000 | 1500.00000 |
| D1 | 1.20070 | 8.28330 | 12.28707 |
| D2 | 12.28671 | 5.20438 | 1.20026 |
| D3 | 8.95875 | 3.50854 | 3.32429 |
| D4 | 3.02173 | 8.47185 | 8.65623 |

Figure 9A:
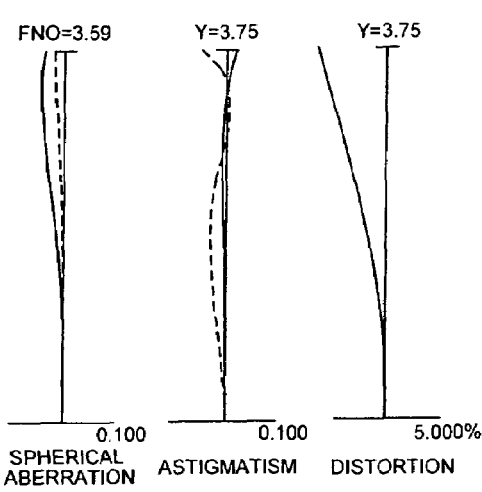
Figure 9B:
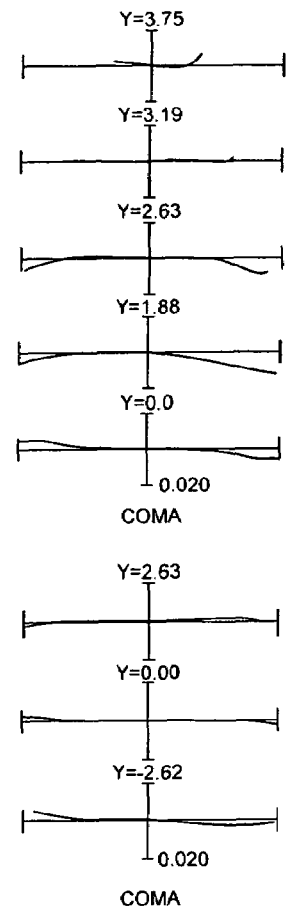
Figure 10A:
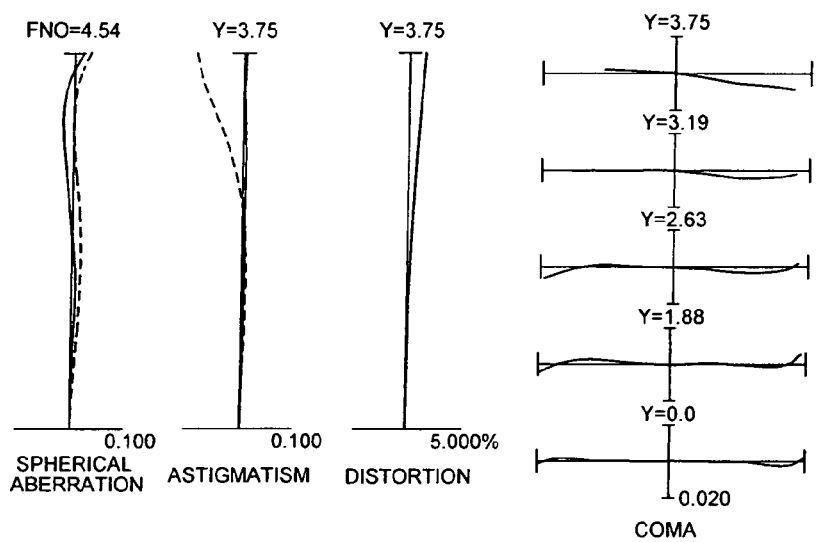
Figure 10B:
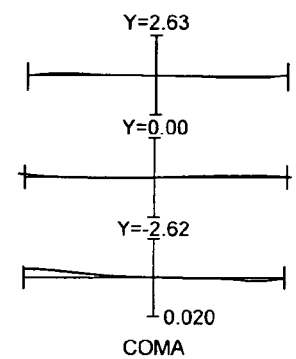
Figure 11A:
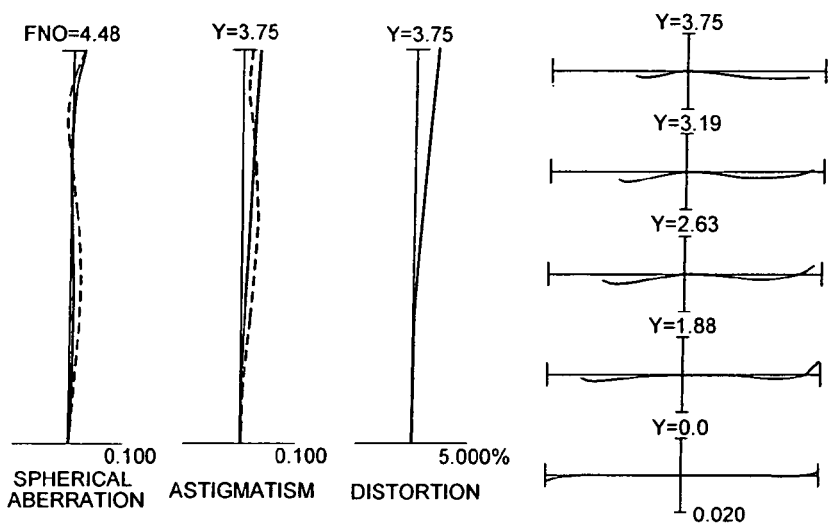
Figure 11B:
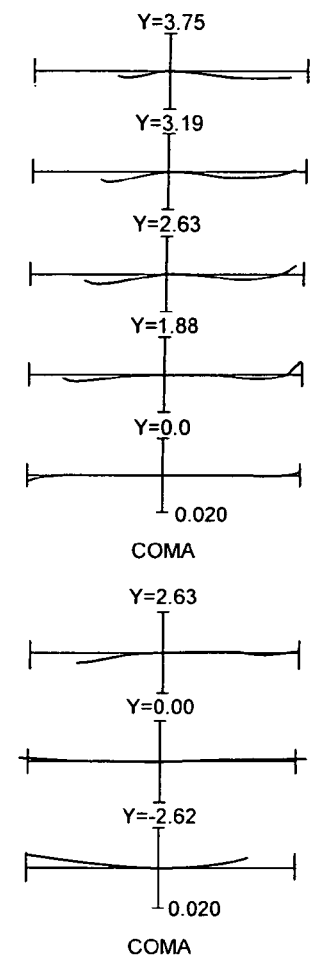
Figure 12A:
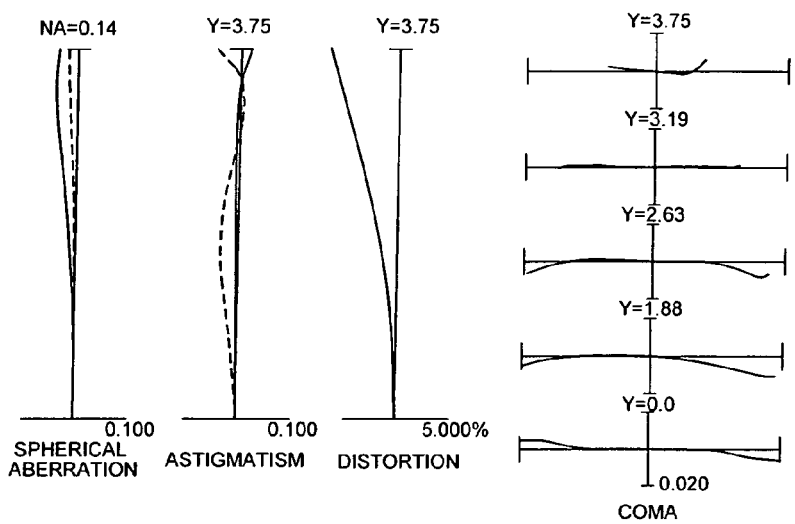
Figure 12B:
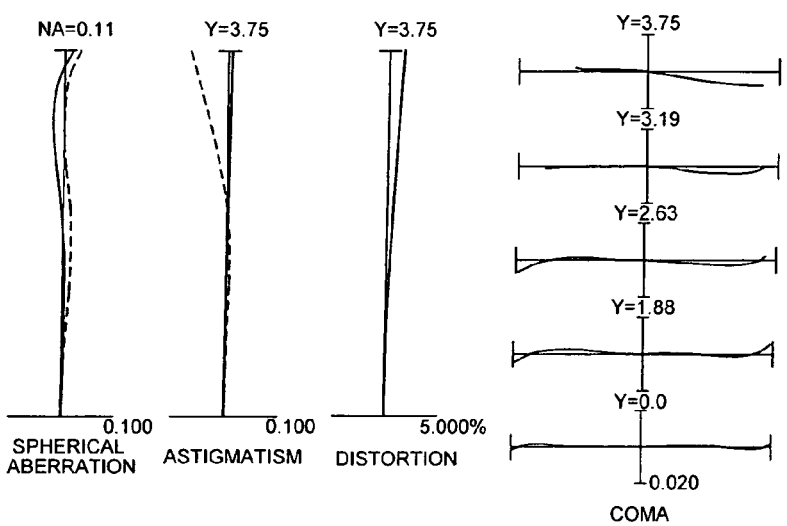
Figure 12C:
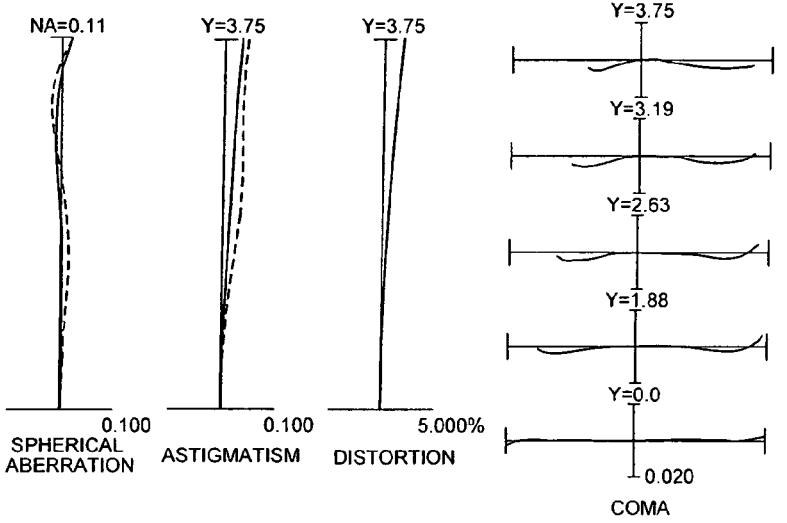

FIGS. 9A and 9B are graphs showing various aberrations of the zoom lens system according to Example 2 in a wide-angle end state upon focusing on infinity, in which FIG. 9A shows various aberrations without carrying out vibration reduction, and FIG. 9B shows coma upon carrying out vibration reduction. FIGS. 10A and 10B are graphs showing various aberrations of the zoom lens system according to Example 2 in an intermediate focal length state upon focusing on infinity, in which FIG. 10A shows various aberrations without carrying out vibration reduction, and FIG. 10B shows coma upon carrying out vibration reduction. FIGS. 11A and 11B are graphs showing various aberrations of the zoom lens system according to Example 2 in a telephoto end state upon focusing on infinity, in which FIG. 11A shows various aberrations without carrying out vibration reduction, and FIG. 11B shows coma upon carrying out vibration reduction. FIGS. 12A, 12B and 12C are graphs showing various aberrations of the zoom lens system according to Example 2 upon focusing on a shooting distance R=1500 mm, in which FIG. 12A shows various aberrations in the wide-angle end state, FIG. 12B shows various aberrations in the intermediate focal length state coma, and FIG. 12C shows various aberrations in the telephoto end state.

As is apparent from the respective graphs, the zoom lens system according to Example 2 shows superb optical performance as a result of good corrections to various aberrations in each focal length state from the wide-angle end state to the telephoto end state.

EXAMPLE 3

Figure 13:
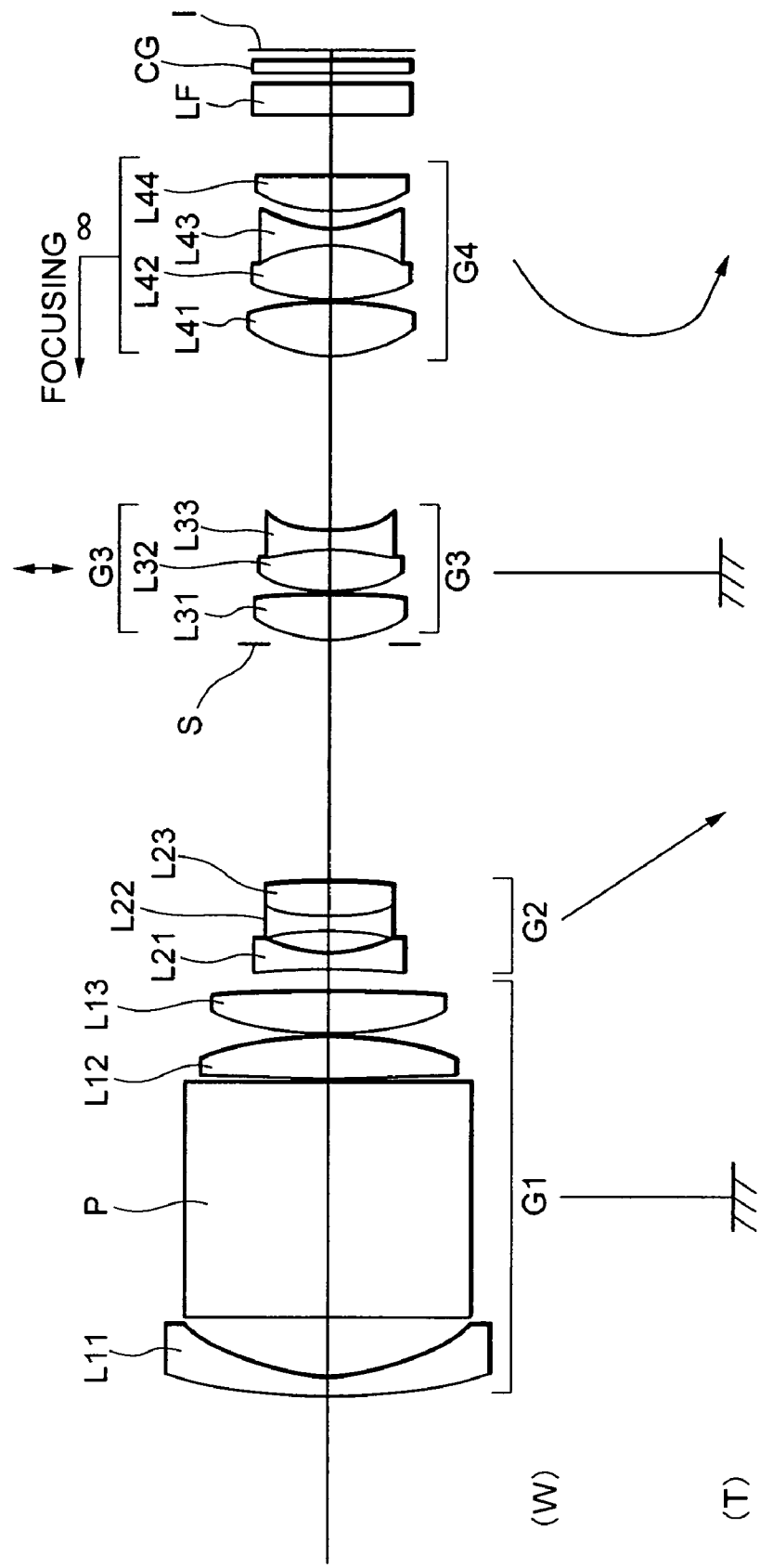
FIG. 13 is a diagram showing a lens configuration of a zoom lens system according to Example 3 of the first embodiment.

FIG. 13 is a diagram showing a lens configuration of a zoom lens system according to Example 3 of the first embodiment. Although the zoom lens system according to Example 3 deflects its optical path by 90 degrees as shown in FIG. 2, the optical path is extended in FIG. 13.

In FIG. 13, the zoom lens system according to Example 3 is composed of, in order from an object, a first lens group G1 having positive refractive power and a rectangular prism P for bending the optical path by 90 degrees, the second lens group G2 having negative refractive power, a third lens group G3 having positive refractive power, and a fourth lens group G4 having positive refractive power. When the focal length varies from a wide-angle end state W to a telephoto end state T, the first lens group G1 and the third lens group G3 are fixed with respect to the image plane I, the second lens group G2 is moved to the image plane I, and the fourth lens group G4 is moved at first to the object and then to the image plane I such that a distance between the first lens group G1 and the second lens group G2 increases, and a distance between the second lens group G2 and the third lens group G3 decreases.

The first lens group G1 is composed of, in order from the object along the optical axis, a negative meniscus lens L11 having a convex surface facing the object, a rectangular prism P for bending the optical path by 90 degrees, a double convex positive lens L12, and a double convex positive lens L13.

The second lens group G2 is composed of, in order from the object along the optical axis, a double concave negative lens L21, and a cemented lens constructed by a double concave negative lens L22 cemented with a double convex positive lens L23.

The third lens group G3 is composed of, in order from the object along the optical axis, a double convex positive lens L31, and a cemented lens constructed by a double convex positive lens L32 cemented with a double concave negative lens L33. An image blur on the image plane I upon generating a camera shake is corrected by shifting the third lens group G3 in the direction substantially perpendicular to the optical axis.

An aperture stop S is disposed in the vicinity of the most object side lens of the third lens group G3 and fixed upon zooming from the wide-angle end state W to the telephoto end state T.

The fourth lens group G4 is composed of, in order from the object along the optical axis, a double convex positive lens L41, a cemented lens constructed by a double convex positive lens L42 cemented with a double concave negative lens L43, and a positive meniscus lens L44 having a convex surface facing the object. Focusing from the infinity to a close object is carried out by moving the fourth lens group G4 along the optical axis to the object.

Between the fourth lens group G4 and the image plane I, there are provided a low pass filter LF for blocking spatial frequency higher than the resolution limit of the solid-state imaging device such as a CCD, and a cover glass CG for protecting the solid-state imaging device.

Various values associated with Example 3 are listed in Table 3.

TABLE 3

[Specifications]

|  | W | M | T |
|---|---|---|---|
| f = | 6.51 | 17.75 | 30.716 |
| FNO = | 3.61 | 4.55 | 4.49 |
| ω = | 31.67 | 11.76 | 6.83° |
| Bf = | 0.70 | | |

[Lens Data]

| | r | d | νd | nd |
|---|---|---|---|---|
| 1) | 27.0714 | 1.0000 | 23.78 | 1.846660 |
| 2) | 10.8124 | 3.1000 | | |
| 3) | ∞ | 6.0000 | 46.57 | 1.804000 |
| 4) | ∞ | 0.0000 | 46.57 | 1.804000 |
| 5) | ∞ | 6.0000 | 46.57 | 1.804000 |
| 6) | ∞ | 0.2000 | | |
| 7) | 88.3161 | 2.1000 | 58.19 | 1.622630 |
| *8) | −20.7757 | 0.2000 | | |
| 9) | 17.3587 | 2.2000 | 82.56 | 1.497820 |
| 10) | −121.5800 | (D1) | | |
| 11) | −21.8799 | 0.8000 | 42.71 | 1.820800 |
| *12) | 9.5495 | 1.1000 | | |
| 13) | −10.0479 | 0.8000 | 52.32 | 1.754998 |
| 14) | 11.2226 | 1.8000 | 23.78 | 1.846660 |
| 15) | −20.5128 | (D2) | | |
| 16> | ∞ | 0.2000 | Aperture Stop S | |
| 17) | 7.4197 | 2.2000 | 58.19 | 1.622630 |
| *18) | −32.4532 | 0.2000 | | |
| 19) | 7.3179 | 2.3000 | 65.44 | 1.603001 |
| 20) | −8.1840 | 0.8000 | 40.76 | 1.882997 |
| 21) | 5.5046 | (D3) | | |
| 22) | 7.3400 | 2.7000 | 64.06 | 1.516330 |
| *23) | −19.6770 | 0.2000 | | |
| 24) | 11.5934 | 2.8000 | 82.56 | 1.497820 |
| 25) | −7.3626 | 0.8000 | 40.76 | 1.882997 |
| 26) | 7.6006 | 0.9000 | | |
| 27) | 8.9259 | 1.8000 | 70.23 | 1.487490 |
| 28) | 362.0690 | (D4) | | |
| 29) | ∞ | 1.6500 | 70.51 | 1.544370 |
| 30) | ∞ | 0.5000 | | |
| 31) | ∞ | 0.5000 | 64.14 | 1.516330 |
| 32) | ∞ | (Bf) | | |

[Aspherical Surface Data]

Surface number: 8 k = +3.6749
C4 = +2.02720E−05
C6 = +1.39580E−07
C8 = +1.76940E−11
C10 = +8.15890E−12

Surface number: 12 k = −1.9761
C4 = +2.69980E−04
C6 = 0.00000E+00
C8 = 0.00000E+00
C10 = 0.00000E+00

Surface number: 18 k = −15.8053
C4 = +6.81820E−05
C6 = −2.95960E−06
C8 = +2.07110E−08
C10 = 0.00000E+00

Surface number: 23 k = −61.0236
C4 = −8.23580E−04
C6 = +5.93180E−05

TABLE 3-continued

C8 = −2.54540E−06
C10 = +4.50460E−08

| | W | M | T |
|---|---|---|---|
| [Zooming Data] | | | |
| f | 6.51005 | 17.75126 | 30.71656 |
| D1 | 1.19950 | 8.28210 | 12.28587 |
| D2 | 12.28609 | 5.20376 | 1.19964 |
| D3 | 8.98739 | 3.72664 | 3.98937 |
| D4 | 2.97987 | 8.24053 | 7.97793 |
| [Focusing Data] | | | |
| D0 | 1500.00000 | 1500.00000 | 1500.00000 |
| D1 | 1.19950 | 8.28210 | 12.28587 |
| D2 | 12.28609 | 5.20376 | 1.19964 |
| D3 | 8.95888 | 3.50867 | 3.32442 |
| D4 | 3.00838 | 8.45850 | 8.64288 |

Figure 14A:
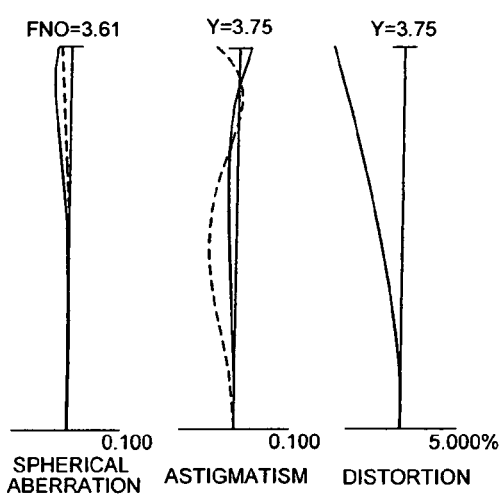
Figure 14B:
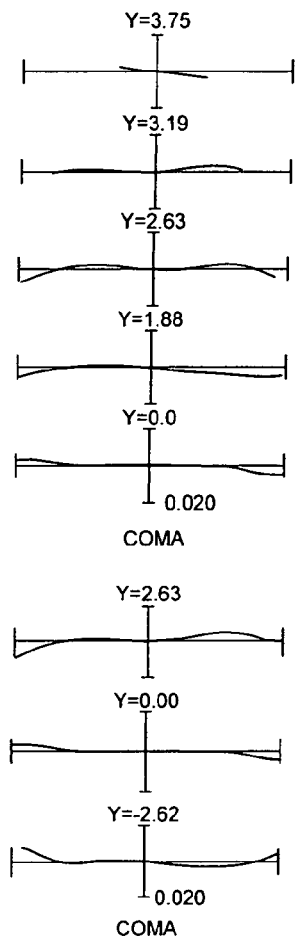
Figure 15A:
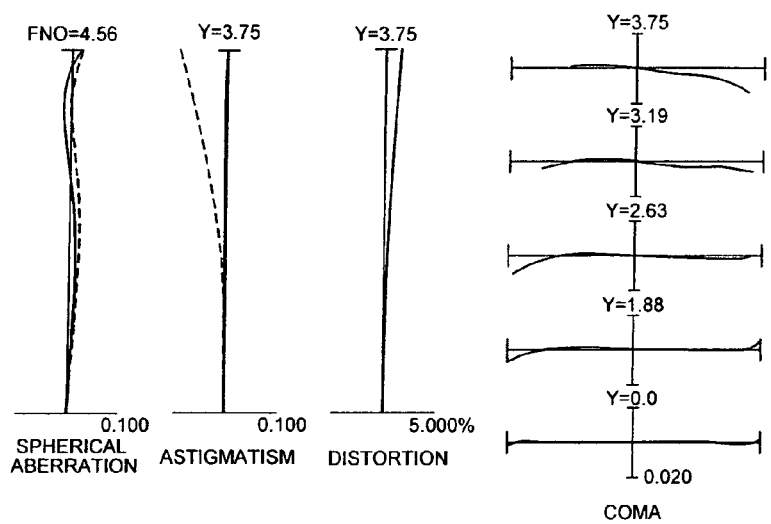
Figure 15B:
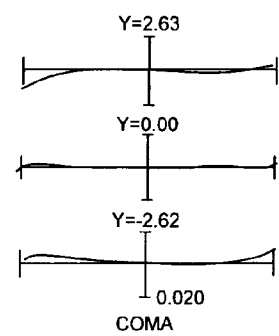
Figure 16A:
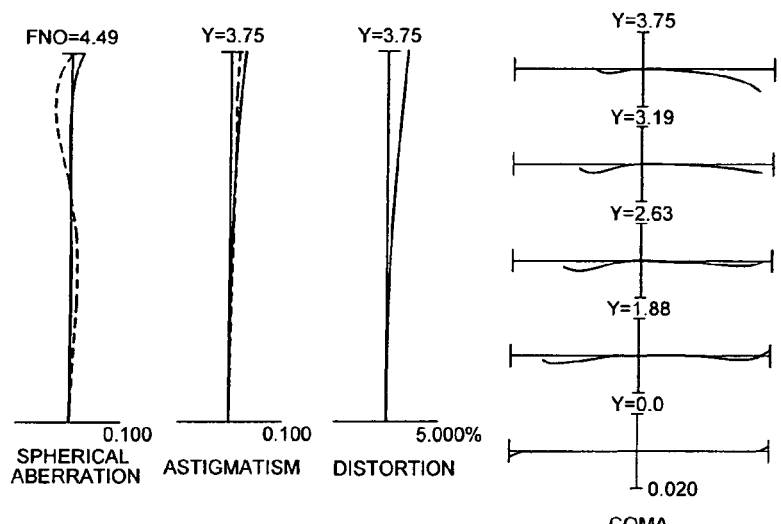
Figure 16B:
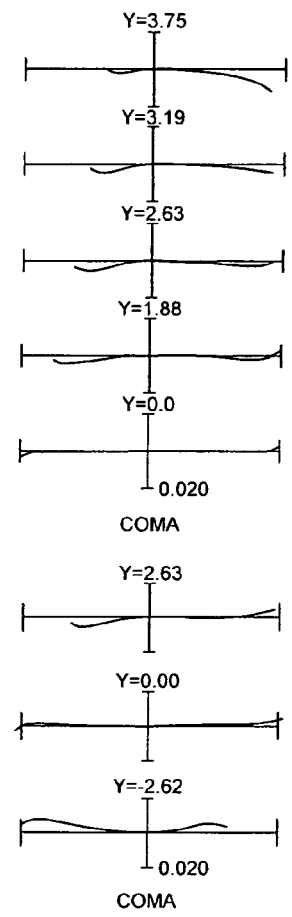
Figure 17A:
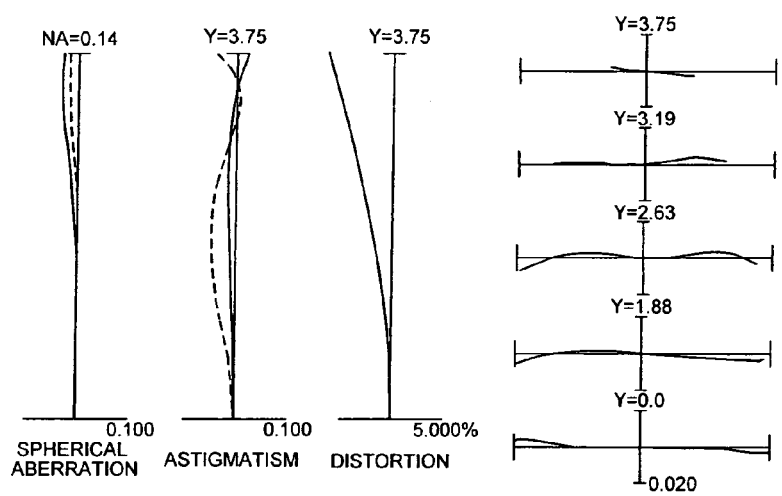
Figure 17B:
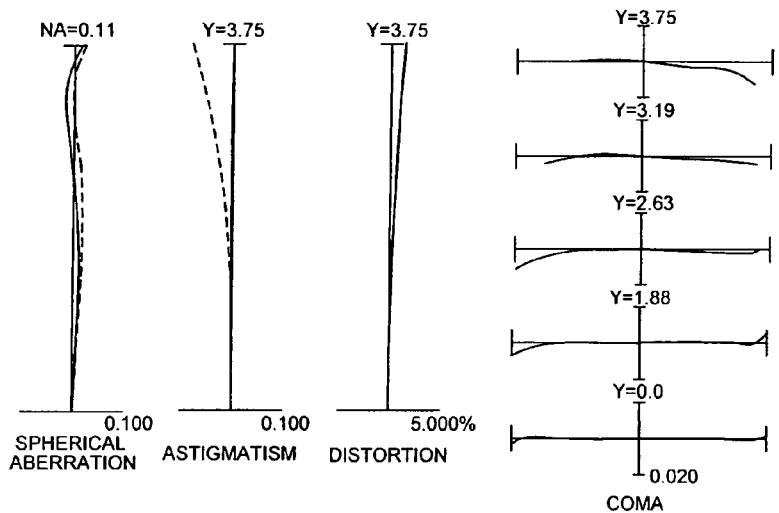
Figure 17C:
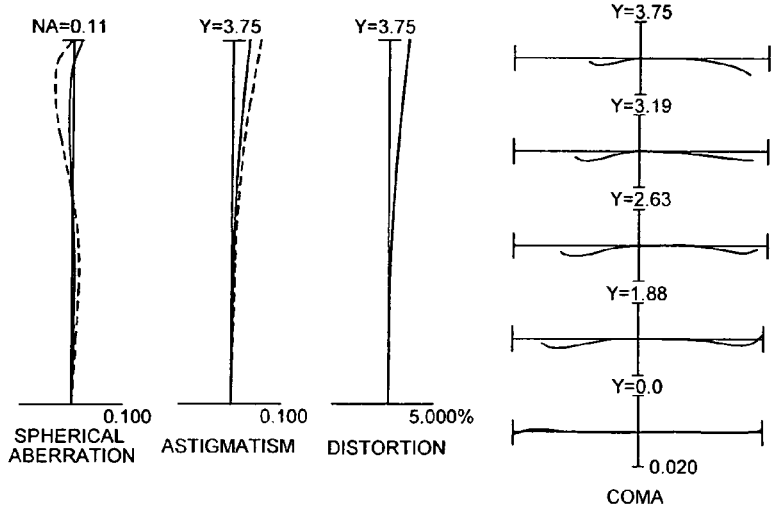

FIGS. 14A and 14B are graphs showing various aberrations of the zoom lens system according to Example 3 in a wide-angle end state upon focusing on infinity, in which FIG. 14A shows various aberrations without carrying out vibration reduction, and FIG. 14B shows coma upon carrying out vibration reduction. FIGS. 15A and 15B are graphs showing various aberrations of the zoom lens system according to Example 3 in an intermediate focal length state upon focusing on infinity, in which FIG. 15A shows various aberrations without carrying out vibration reduction, and FIG. 15B shows coma upon carrying out vibration reduction. FIGS. 16A and 16B are graphs showing various aberrations of the zoom lens system according to Example 3 in a telephoto end state upon focusing on infinity, in which FIG. 16A shows various aberrations without carrying out vibration reduction, and FIG. 16B shows coma upon carrying out vibration reduction. FIGS. 17A, 17B and 17C are graphs showing various aberrations of the zoom lens system according to Example 3 upon focusing on a shooting distance R=1500 mm, in which FIG. 17A shows various aberrations in the wide-angle end state, FIG. 17B shows various aberrations in the intermediate focal length state coma, and FIG. 17C shows various aberrations in the telephoto end state.

As is apparent from the respective graphs, the zoom lens system according to Example 3 shows superb optical performance as a result of good corrections to various aberrations in each focal length state from the wide-angle end state to the telephoto end state.

Second Embodiment

A zoom lens system according to a second embodiment is explained below.

A zoom lens system according to the second embodiment is composed of, in order from an object along an optical axis, a first lens group having positive refractive power and an optical path bending member for bending the optical path by substantially 90 degrees, a second lens group having negative refractive power, a third lens group having positive refractive power, and a fourth lens group having positive refractive power. When the focal length varies from a wide-angle end state to a telephoto end state, which is called as zooming, the first lens group and the third lens group are fixed with respect to an image plane, the second lens group is moved to the image plane, and the fourth lens group is moved at first to the object and then to the image plane such that a distance between the first lens group and the second lens group increases, and a distance between the second lens group and the third lens group decreases. In the wide-angle end state and the telephoto end state, focusing from infinity to a close object is carried out by moving the fourth lens group along the optical axis. In the other focal length states, focusing is carried out by moving the second lens group along the optical axis.

With such configuration, it becomes possible to provide a zoom lens system having high optical performance, and an ultra-compactness, suitable for an optical device such as a compact video camera, an electronic still camera, and the like using a solid-state imaging device.

The first lens group disposed to the most object side is always fixed upon zooming from the wide-angle end state to the telephoto end state and focusing, so that the first lens group which is the largest lens group in the zoom lens system is not necessary to move. Accordingly, the driving mechanism can be simple.

Since zooming is carried out by lens groups except the first lens group that is the largest lens group, it becomes possible to use a smaller driving mechanism than the one used to be used.

Upon zooming from the wide-angle end state to the telephoto end state, the second lens group is moved to the image plane, the fourth lens group is moved at first to the object and then to the image such that the first lens group and the third lens group is fixed with respect to the image plane, a distance between the first lens group and the second lens group increases, and a distance between the second lens group and the third lens group decreases. In particular, the fourth lens group moves such that a distance between the third lens group and the fourth lens group decreases from the wide-angle end state to a given focal length state. From the given focal length state to the telephoto end state, the fourth lens group is moved to the image plane so as to increase the distance. With constructing the zoom lens system such a manner, it becomes possible to secure a moving space for the focusing lens group in the telephoto end state.

In the wide-angle end state and the telephoto end state, focusing from infinity to a close object is carried out by moving the fourth lens group along the optical axis. In the other focal length states, focusing is carried out by moving the second lens group along the optical axis.

In the wide-angle end state, the first lens group and the second lens group come to the closest state with each other. Accordingly, in the wide-angle end state, when focusing is carried out by moving the second lens group to the object, a space for moving the second lens group has to be secured between the first lens group and the second lens group, so that the dimension of the zoom lens system becomes large. Moreover, with this configuration, the distance between the first lens group and the second lens group has to be large, so that variation in astigmatism and coma becomes large. In the zoom lens system according to the second embodiment, focusing from infinity to a close object is carried out by moving the fourth lens group, which has a large space to the object side in the wide-angle end state, along the optical axis to the object. The distance between the first lens group and the second lens group can be kept minimum, so that the dimension of the zoom lens system can be compact. Moreover, focusing in the wide-angle end state is carried out by the fourth lens group, astigmatism and coma can be kept to be well corrected state.

On the other hand, in the telephoto end state, both of the second lens group and the fourth lens group can be secured a large space to the object side, so that either one can carry out focusing. However, the fourth lens group is more preferable to carry out focusing than the second lens group to suppress variation in astigmatism and coma.

In the other focal length states than the wide-angle end state and the telephoto end state, the fourth lens group is moved to the third lens group side upon zooming to make the distance between the third lens group and the fourth lens group small. On the other hand, the second lens group is moved to the image plane side upon zooming to make the distance between the first lens group and the second lens group wide, so that the space for focusing from infinity to a close object by moving the second lens group along the optical axis to the object can be secured without making the zoom lens system larger. Accordingly, in order to realize compactness of the whole dimension of the zoom lens system, it is easier to carry out focusing by the second lens group. Moreover, in this focal length state, variation in astigmatism and coma can be small by carrying out focusing by the second lens group.

Focusing from infinity to a close object is carried out by moving the fourth lens group along the optical axis to the object in the wide-angle end state and the telephoto end state, and carried out by moving the second lens group along the optical axis to the object in the other focal length states. In this manner, with changing focusing lens group in accordance with the focal length state, the dimension of the zoom lens system can be compact, variation in astigmatism and coma upon focusing can be suppressed, and high optical performance can be secured.

Moreover, in the zoom lens system according to the second embodiment, it is preferable that the third lens group is composed of, in order from the object along the optical axis, a positive lens, and a cemented lens constructed by a positive lens cemented with a negative lens.

With constructing in this manner, it becomes possible to excellently correct various basic aberrations produced in the third lens group. Moreover, by shifting the third lens group in the direction substantially perpendicular to the optical axis, it becomes possible to suppress variation in coma when correcting the image blur on the image plane upon generating a camera shake. On the other hand, when the third lens group is composed of, in order from the object, a positive lens, and a cemented lens constructed by a negative lens cemented with a positive lens, it becomes difficult to excellently correct aberrations such as coma upon correcting the image blur and to secure the vibration reduction function in a sophisticated state, so that it is undesirable.

Moreover, in the zoom lens system according to the second embodiment, it is preferable that the fourth lens group is composed of, in order from the object along the optical axis, a positive lens, a cemented lens constructed by a positive lens cemented with a negative lens, and a positive lens.

With constructing in this manner, it becomes possible to excellently correct variation in coma upon zooming such that the fourth lens group is moved to the object from the wide-angle end state to a given focal length state so as to decrease a distance between the third lens group and the fourth lens group, and moved to the image from the given focal length state to the telephoto end state so as to increase the distance.

Moreover, in the zoom lens system according to the second embodiment, it is preferable that the first lens group is composed of, in order from the object along the optical axis, a negative lens, an optical path bending member, a positive lens, and a positive lens.

With constructing in this manner, it becomes possible to excellently correct astigmatism and coma produced in the first lens group. Moreover, it becomes possible to correct variation in coma upon correcting the image blur by the third lens group.

Moreover, in the zoom lens system according to the second embodiment, it is preferable that each lens group from the first lens group to the fourth lens group has at least one aspherical lens. With disposing an aspherical lens in each lens group so as to correct various aberrations produced in each lens group, it becomes possible to reduce variation in various aberrations upon zooming and focusing.

Moreover, in the zoom lens system according to the second embodiment, it is preferable that a rectangular prism is used as the optical path bending member. The rectangular prism can deflect the optical path by a total internal reflection, reduce the loss of the light amount, and make the optical system compact. Incidentally, a mirror or an optical fiber may be used as the optical path bending member except the rectangular prism.

Moreover, in the zoom lens system according to the second embodiment, it is preferable that when generating a camera shake, an image blur on the image plane is corrected by moving the third lens group in a direction perpendicular to the optical axis.

The third lens group is fixed upon zooming and is shifted in the direction substantially perpendicular to the optical axis to correct an image blur upon generating a camera shake. With introducing a mechanism that shifts the third lens group having the smallest effective diameter in the zoom lens system in the direction substantially perpendicular to the optical axis, it becomes possible to suppress deterioration in optical performance upon shifting the third lens group to be minimum. Moreover, it becomes possible to shift the third lens group with a driving system having a minute torque, so that the whole camera system can be compact. Furthermore, since the moving amount of the image on the image plane is large upon shifting the third lens group, the shift amount of the third lens group can be small upon correcting the image blur.

A method for focusing of the zoom lens system according to the second embodiment is as follows: the zoom lens system includes, in order from the object, a first lens group having positive refractive power and an optical path bending member for bending the optical path by substantially 90 degrees, a second lens group having negative refractive power, a third lens group having positive refractive power, and a fourth lens group having positive refractive power; when a focal length of the zoom lens system varies from a wide-angle end state to a telephoto end state, the first lens group and the third lens group are fixed with respect to the image plane, the second lens group is moved to the image plane, and the fourth lens group is moved at first to the object and then to the image plane; and the method for focusing from infinity to a close object is carried out by moving the fourth lens group along the optical axis in the wide-angle end state and the telephoto end state, and carried out by moving the second lens group along the optical axis in the other focal length states.

Focusing from infinity to a close object is carried out by moving the fourth lens group along the optical axis to the object in the wide-angle end state and the telephoto end state, and carried out by moving the second lens group along the optical axis to the object in the other focal length states. In this manner, with changing focusing lens group in accordance with the focal length state, the dimension of the zoom lens system can be compact, variation in astigmatism and coma upon focusing can be suppressed, and high optical performance can be secured.

Moreover, a method for varying a focal length of the zoom lens system according to the second embodiment is as follows: the zoom lens system includes, in order from the object, a first lens group having positive refractive power and an optical path bending member for bending the optical path by substantially 90 degrees, a second lens group having negative refractive power, a third lens group having positive refractive power, and a fourth lens group having positive refractive power; focusing from infinity to a close object is carried out by moving the fourth lens group along the optical axis in a wide-angle end state and a telephoto end state, and moving the second lens group along the optical axis in the other focal length states; and the method is carried out such that when a focal length of the zoom lens system varies from the wide-angle end state to the telephoto end state, the first lens group and the third lens group are fixed with respect to the image plane, the second lens group is moved to the image plane, and the fourth lens group is moved at first to the object and then to the image plane.

With introducing the method for varying the focal length, it becomes possible to secure the moving space for the focusing lens in the telephoto end state. Moreover, it becomes possible to excellently correct astigmatism and coma upon zooming.

Moreover, a method for correcting an image blur of a zoom lens system according to the second embodiment is as follows: the zoom lens system includes, in order from the object, a first lens group having positive refractive power and an optical path bending member for bending the optical path by substantially 90 degrees, a second lens group having negative refractive power, a third lens group having positive refractive power, and a fourth lens group having positive refractive power; when a focal length of the zoom lens system varies from a wide-angle end state to a telephoto end state, the first lens group and the third lens group are fixed with respect to the image plane, the second lens group is moved to the image plane, and the fourth lens group is moved at first to the object and then to the image plane; focusing from infinity to a close object is carried out by moving the fourth lens group along the optical axis in a wide-angle end state and a telephoto end state, and carried out by moving the second lens group along the optical axis in the other focal length states; and the method is carried out by moving the third lens group in a direction perpendicular to the optical axis to correct an image blur on the image plane upon generating a camera shake.

With introducing the method for correcting an image blur such that the third lens group, which has the smallest effective diameter in the zoom lens system, is shifted in the direction substantially perpendicular to the optical axis, it becomes possible to suppress deterioration in optical performance upon shifting the third lens group to be minimum. Moreover, it becomes possible to shift the third lens group with a driving system having a minute torque, so that the whole camera system can be compact. Furthermore, since the moving amount of the image on the image plane is large upon shifting the third lens group, the shift amount of the third lens group can be small upon correcting the image blur.

Furthermore, at least one plastic lens can be used in each lens group. With using plastic lenses in this manner, it becomes possible to realize further reduction of manufacturing cost and the weight thereof. In addition, the zoom lens system according to the second embodiment can be used for an optical system of an optical device except camera such as an optical measuring device and an endoscope.

Each example of the zoom lens system according to the second embodiment is explained with reference to accompanying drawings.

EXAMPLE 4

FIG. 18 is a diagram showing a lens configuration of a zoom lens system according to Example 4 of the second embodiment. Although the zoom lens system according to Example 4 deflects its optical path by 90 degrees as shown in FIG. 2, the optical path is extended in FIG. 18.

In FIG. 18, the zoom lens system according to Example 4 is composed of, in order from an object, a first lens group G1 having positive refractive power and a rectangular prism P for bending the optical path by 90 degrees, the second lens group G2 having negative refractive power, a third lens group G3 having positive refractive power, and a fourth lens group G4 having positive refractive power. When the focal length varies from a wide-angle end state W to a telephoto end state T, the first lens group G1 and the third lens group G3 are fixed with respect to the image plane I, the second lens group G2 is moved to the image plane I, and the fourth lens group G4 is moved at first to the object and then to the image plane I such that a distance between the first lens group G1 and the second lens group G2 increases, and a distance between the second lens group G2 and the third lens group G3 decreases. Focusing from infinity to a close object is carried out by moving the fourth lens group G4 along the optical axis in the wide-angle end state W and the telephoto end state T, and by moving the second lens group G2 along the optical axis in the other focal length states.

The first lens group G1 is composed of, in order from the object along the optical axis, a negative meniscus lens L11 having a convex surface facing the object, a rectangular prism P for bending the optical path by 90 degrees, a double convex positive lens L12, and a double convex positive lens L13.

The second lens group G2 is composed of, in order from the object along the optical axis, a double concave negative lens L21, and a cemented lens constructed by a double concave negative lens L22 cemented with a double convex positive lens L23.

The third lens group G3 is composed of, in order from the object along the optical axis, a double convex positive lens L31, and a cemented lens constructed by a double convex positive lens L32 cemented with a double concave negative lens L33. An image blur on the image plane I upon generating a camera shake is corrected by shifting the third lens group G3 in the direction substantially perpendicular to the optical axis.

The fourth lens group G4 is composed of, in order from the object along the optical axis, a double convex positive lens L41, a cemented lens constructed by a double convex positive lens L42 cemented with a double concave negative lens L43, and a positive meniscus lens L44 having a convex surface facing the object.

An aperture stop S is disposed in the vicinity of the most object side lens of the third lens group G3 and fixed upon zooming from the wide-angle end state W to the telephoto end state T.

Between the fourth lens group G4 and the image plane I, there are provided a low pass filter LF for blocking spatial frequency higher than the resolution limit of the solid-state imaging device such as a CCD, and a cover glass CG for protecting the solid-state imaging device.

Various values associated with Example 4 are listed in Table 4.

TABLE 4

| [Specifications] | | | |
|---|---|---|---|
| | W | M | T |
| f = | 6.51 | 18.81 | 30.72 |
| FNO = | 3.67 | 4.68 | 4.55 |
| ω = | 31.67 | 11.11 | 6.83° |
| Bf = | 0.70 | | |

TABLE 4-continued

[Lens Data]

|  | r | d | vd | nd |
|---|---|---|---|---|
| 1) | 34.0078 | 1.0000 | 23.78 | 1.846660 |
| 2) | 11.9200 | 3.0000 |  |  |
| 3) | ∞ | 6.0000 | 46.57 | 1.804000 |
| 4) | ∞ | 0.0000 | 46.57 | 1.804000 |
| 5) | ∞ | 6.0000 | 46.57 | 1.804000 |
| 6) | ∞ | 0.2000 |  |  |
| 7) | 172.9183 | 2.1000 | 58.19 | 1.622630 |
| *8) | −21.5758 | 0.2000 |  |  |
| 9) | 16.2691 | 2.2000 | 82.56 | 1.497820 |
| 10) | −78.0069 | (D1) |  |  |
| 11) | −29.6692 | 0.8000 | 42.71 | 1.820800 |
| *12) | 9.2335 | 1.1500 |  |  |
| 13) | −9.3606 | 0.8000 | 52.32 | 1.754998 |
| 14) | 10.5270 | 1.8000 | 23.78 | 1.846660 |
| 15) | −21.0946 | (D2) |  |  |
| 16> | ∞ | 0.2000 | Aperture Stop S |  |
| 17) | 7.5249 | 2.2000 | 58.19 | 1.622630 |
| *18) | −33.6584 | 0.2000 |  |  |
| 19) | 7.1581 | 2.3000 | 65.44 | 1.603001 |
| 20) | −8.4228 | 0.8000 | 40.76 | 1.882997 |
| 21) | 5.4883 | (D3) |  |  |
| 22) | 7.4598 | 2.7000 | 64.06 | 1.516330 |
| *23) | −19.5058 | 0.2000 |  |  |
| 24) | 10.6948 | 2.8000 | 82.56 | 1.497820 |
| 25) | −7.0556 | 0.8000 | 40.76 | 1.882997 |
| 26) | 7.1661 | 0.9000 |  |  |
| 27) | 8.2394 | 1.8000 | 70.23 | 1.487490 |
| 28) | 541.6317 | (D4) |  |  |
| 29) | ∞ | 1.6500 | 70.51 | 1.544370 |
| 30) | ∞ | 0.5000 |  |  |
| 31) | ∞ | 0.5000 | 64.14 | 1.516330 |
| 32) | ∞ | (Bf) |  |  |

[Aspherical Surface Data]

Surface number: 8 k = +2.9632
C4 = +1.55230E−05
C6 = −6.51240E−09
C8 = +2.18230E−09
C10 = −3.24580E−11
Surface number: 12 k = −2.1186
C4 = +4.03570E−04
C6 = −1.33380E−06
C8 = 0.00000E+00
C10 = 0.00000E+00
Surface number: 18 k = −12.3215
C4 = +5.92900E−05
C6 = −7.12220E−07
C8 = −8.69530E−08
C10 = 0.00000E+00
Surface number: 23 k = −69.5236
C4 = −1.02210E−03
C6 = +7.43260E−05
C8 = −3.61680E−06
C10 = +7.49980E−08

|  | W | M | T |
|---|---|---|---|
| [Zooming Data] | | | |
| f | 6.51005 | 18.81000 | 30.71656 |
| D1 | 1.19992 | 8.62300 | 12.28629 |
| D2 | 12.28640 | 4.86332 | 1.19995 |
| D3 | 8.98717 | 3.47774 | 3.98915 |
| D4 | 2.98109 | 8.49052 | 7.97915 |

TABLE 4-continued

[Focusing Data]

| D0 | 1500.00000 | 1500.00000 | 1500.00000 |
|---|---|---|---|
| D1 | 1.19992 | 8.31873 | 12.28629 |
| D2 | 12.28640 | 5.16759 | 1.19995 |
| D3 | 8.95866 | 3.47774 | 3.32419 |
| D4 | 3.00960 | 8.49052 | 8.64411 |

Figure 19A:
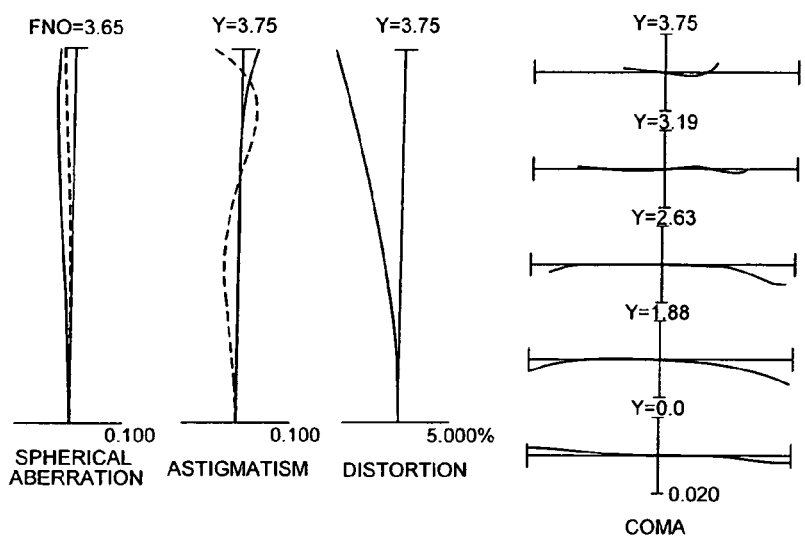
Figure 19B:
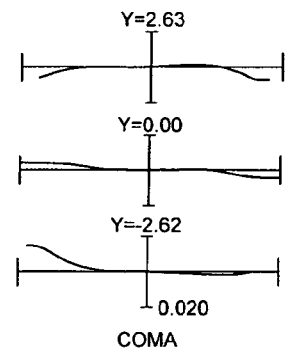
Figure 20A:
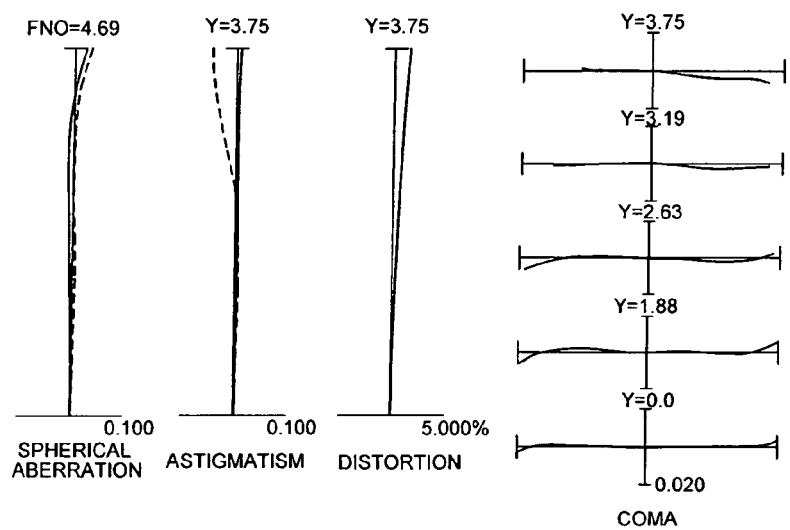
Figure 20B:
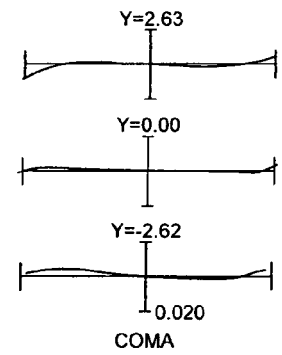
Figure 21A:
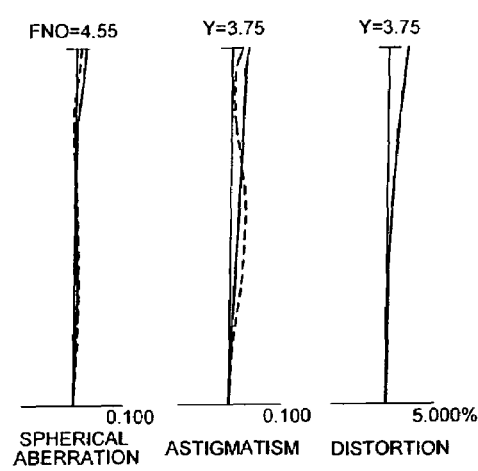
Figure 21B:
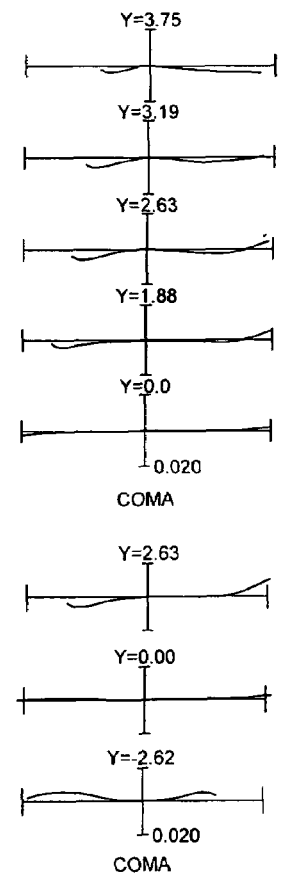
Figure 24A:
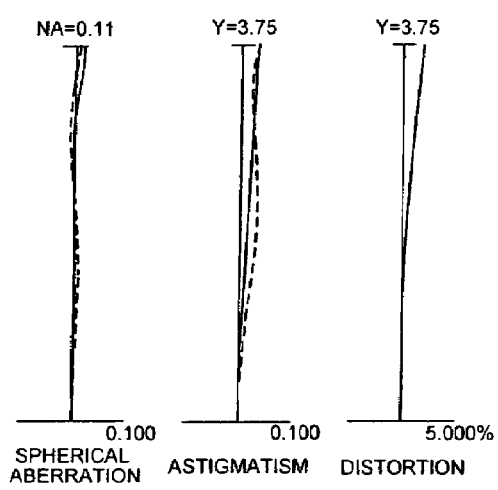
Figure 24B:
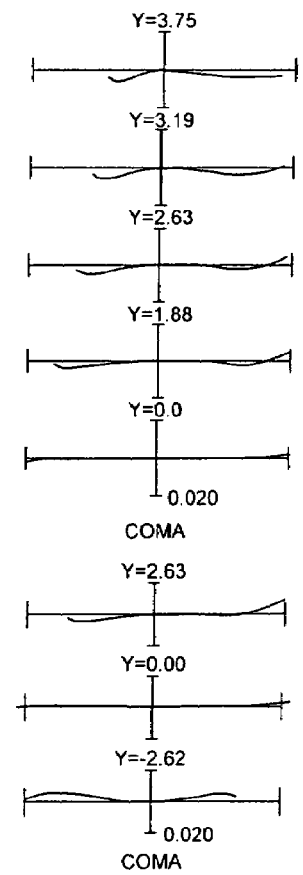

FIGS. 19A and 19B are graphs showing various aberrations of the zoom lens system according to Example 4 in a wide-angle end state upon focusing on infinity, in which FIG. 19A shows various aberrations without carrying out vibration reduction, and FIG. 19B shows coma upon carrying out vibration reduction. FIGS. 20A and 20B are graphs showing various aberrations of the zoom lens system according to Example 4 in an intermediate focal length state upon focusing on infinity, in which FIG. 20A shows various aberrations without carrying out vibration reduction, and FIG. 20B shows coma upon carrying out vibration reduction. FIGS. 21A and 21B are graphs showing various aberrations of the zoom lens system according to Example 4 in a telephoto end state upon focusing on infinity, in which FIG. 21A shows various aberrations without carrying out vibration reduction, and FIG. 21B shows coma upon carrying out vibration reduction. FIGS. 22A and 22B are graphs showing various aberrations of the zoom lens system according to Example 4 in the wide-angle end state upon focusing on a shooting distance R=1500 mm, in which FIG. 22A shows various aberrations without carrying out vibration reduction, and FIG. 22B shows coma upon carrying out vibration reduction. FIGS. 23A and 23B are graphs showing various aberrations of the zoom lens system according to Example 4 in the intermediate focal length state upon focusing on a shooting distance R=1500 mm, in which FIG. 23A shows various aberrations without carrying out vibration reduction, and FIG. 23B shows coma upon carrying out vibration reduction. FIGS. 24A and 24B are graphs showing various aberrations of the zoom lens system according to Example 4 in the telephoto end state upon focusing on a shooting distance R=1500 mm, in which FIG. 24A shows various aberrations without carrying out vibration reduction, and FIG. 24B shows coma upon carrying out vibration reduction.

As is apparent from the respective graphs, the zoom lens system according to Example 4 shows superb optical performance as a result of good corrections to various aberrations in each focal length state from the wide-angle end state to the telephoto end state.

EXAMPLE 5

Figure 25:
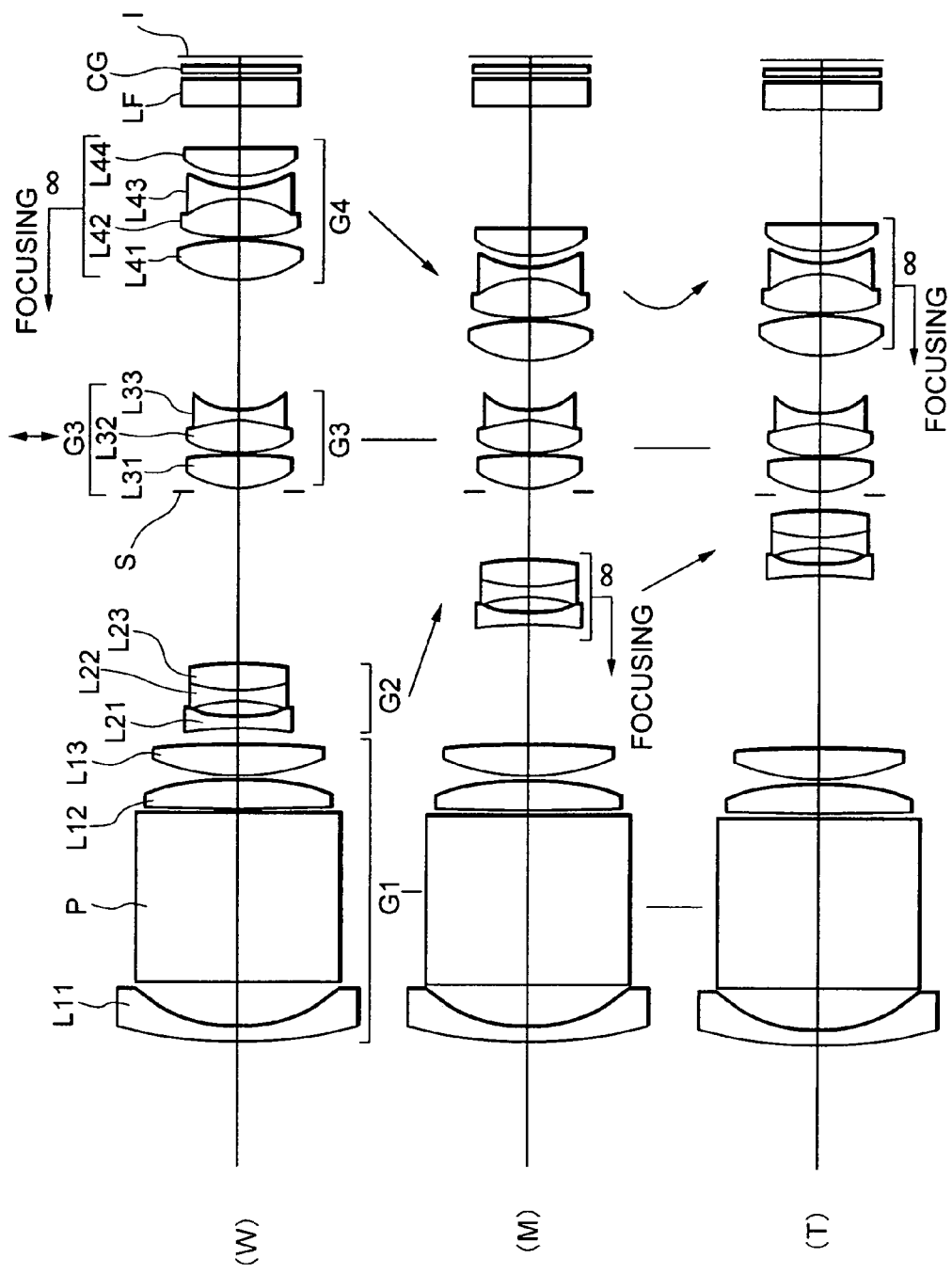
FIG. 25 is a diagram showing a lens configuration of a zoom lens system according to Example 5 of the second embodiment.

FIG. 25 is a diagram showing a lens configuration of a zoom lens system according to Example 5 of the second embodiment. Although the zoom lens system according to Example 5 deflects its optical path by 90 degrees as shown in FIG. 2, the optical path is extended in FIG. 25.

In FIG. 25, the zoom lens system according to Example 5 is composed of, in order from an object, a first lens group G1 having positive refractive power and a rectangular prism P for bending the optical path by 90 degrees, the second lens group G2 having negative refractive power, a third lens group G3 having positive refractive power, and a fourth lens group G4 having positive refractive power. When the focal length varies from a wide-angle end state W to a telephoto end state T, the first lens group G1 and the third lens group G3 are fixed with respect to the image plane I, the second lens group G2 is moved to the image plane I, and the fourth lens group G4 is moved at first to the object and then to the image plane I such that a distance between the first lens group G1 and the second lens group G2 increases, and a distance between the second lens group G2 and the third lens group G3 decreases. Focusing from infinity to a close object is carried out by moving the fourth lens group G4 along the optical axis in the wide-angle end state W and the telephoto end state T, and by moving the second lens group G2 along the optical axis in the other focal length states.

The first lens group G1 is composed of, in order from the object along the optical axis, a negative meniscus lens L11 having a convex surface facing the object, a rectangular prism P for bending the optical path by 90 degrees, a double convex positive lens L12, and a double convex positive lens L13.

The second lens group G2 is composed of, in order from the object along the optical axis, a double concave negative lens L21, and a cemented lens constructed by a double concave negative lens L22 cemented with a double convex positive lens L23.

The third lens group G3 is composed of, in order from the object along the optical axis, a double convex positive lens L31, and a cemented lens constructed by a double convex positive lens L32 cemented with a double concave negative lens L33. An image blur on the image plane I upon generating a camera shake is corrected by shifting the third lens group G3 in the direction substantially perpendicular to the optical axis.

The fourth lens group G4 is composed of, in order from the object along the optical axis, a double convex positive lens L41, a cemented lens constructed by a double convex positive lens L42 cemented with a double concave negative lens L43, and a positive meniscus lens L44 having a convex surface facing the object.

An aperture stop S is disposed in the vicinity of the most object side lens of the third lens group G3 and fixed upon zooming from the wide-angle end state W to the telephoto end state T.

Between the fourth lens group G4 and the image plane I, there are provided a low pass filter LF for blocking spatial frequency higher than the resolution limit of the solid-state imaging device such as a CCD, and a cover glass CG for protecting the solid-state imaging device.

Various values associated with Example 5 are listed in Table 5.

TABLE 5

[Specifications]

|  | W | M | T |
|---|---|---|---|
| f = | 6.51 | 17.75 | 30.72 |
| FNO = | 3.60 | 4.53 | 4.47 |
| ω = | 31.67 | 11.76 | 6.83° |
| Bf = | 0.70 | | |

[Lens Data]

|  | r | d | νd | nd |
|---|---|---|---|---|
| 1) | 31.1465 | 1.0000 | 23.78 | 1.846660 |
| 2) | 11.5504 | 3.0000 | | |
| 3) | ∞ | 6.0000 | 46.57 | 1.804000 |
| 4) | ∞ | 0.0000 | 46.57 | 1.804000 |
| 5) | ∞ | 6.0000 | 46.57 | 1.804000 |
| 6) | ∞ | 0.2000 | | |
| 7) | 264.1434 | 2.1000 | 58.19 | 1.622630 |
| *8) | −20.7136 | 0.2000 | | |
| 9) | 16.0315 | 2.2000 | 82.56 | 1.497820 |
| 10) | −85.2611 | (D1) | | |
| 11) | −25.3286 | 0.8000 | 42.71 | 1.820800 |

TABLE 5-continued

| *12) | 9.4152 | 1.1000 | | |
|---|---|---|---|---|
| 13) | −9.9778 | 0.8000 | 52.32 | 1.754998 |
| 14) | 10.3391 | 1.8000 | 23.78 | 1.846660 |
| 15) | −22.0842 | (D2) | | |
| 16> | ∞ | 0.2000 | Aperture Stop S | |
| 17) | 7.5735 | 2.2000 | 58.19 | 1.622630 |
| *18) | −33.3358 | 0.2000 | | |
| 19) | 7.1359 | 2.3000 | 65.44 | 1.603001 |
| 20) | −8.5676 | 0.8000 | 40.76 | 1.882997 |
| 21) | 5.4802 | (D3) | | |
| 22) | 7.4365 | 2.7000 | 64.06 | 1.516330 |
| *23) | −19.2699 | 0.2000 | | |
| 24) | 11.1202 | 2.8000 | 82.56 | 1.497820 |
| 25) | −6.9958 | 0.8000 | 40.76 | 1.882997 |
| 26) | 7.4978 | 0.9000 | | |
| 27) | 8.6160 | 1.8000 | 70.23 | 1.487490 |
| 28) | 466.7448 | (D4) | | |
| 29) | ∞ | 1.6500 | 70.51 | 1.544370 |
| 30) | ∞ | 0.5000 | | |
| 31) | ∞ | 0.5000 | 64.14 | 1.516330 |
| 32) | ∞ | (Bf) | | |

[Aspherical Surface Data]

Surface number: 8 k = +3.5552
C4 = +2.46240E−05
C6 = +1.15750E−07
C8 = +9.22190E−10
C10 = −5.36320E−12

Surface number: 12 k = −1.9594
C4 = +3.27520E−04
C6 = 0.00000E+00
C8 = 0.00000E+00
c10 = 0.00000E+00

Surface number: 18 k = −12.3650
C4 = +6.27710E−05
C6 = −1.84810E−06
C8 = −1.93740E−08
C10 = 0.00000E+00

Surface number: 23 k = −69.5093
C4 = −1.04130E−03
C6 = +7.50630E−05
C8 = −3.53900E−06
C10 = +7.10820E−08

|  | W | M | T |
|---|---|---|---|
| [Zooming Data] | | | |
| f | 6.51005 | 17.75126 | 30.71656 |
| D1 | 1.20070 | 8.28330 | 12.28707 |
| D2 | 12.28671 | 5.20438 | 1.20026 |
| D3 | 8.98726 | 3.72651 | 3.98924 |
| D4 | 2.99322 | 8.25388 | 7.99128 |
| [Focusing Data] | | | |
| D0 | 1500.00000 | 1500.00000 | 1500.00000 |
| D1 | 1.20070 | 8.02471 | 12.28707 |
| D2 | 12.28671 | 5.46297 | 1.20026 |
| D3 | 8.95875 | 3.72651 | 3.32429 |
| D4 | 3.02173 | 8.25388 | 8.65623 |

Figure 26A:
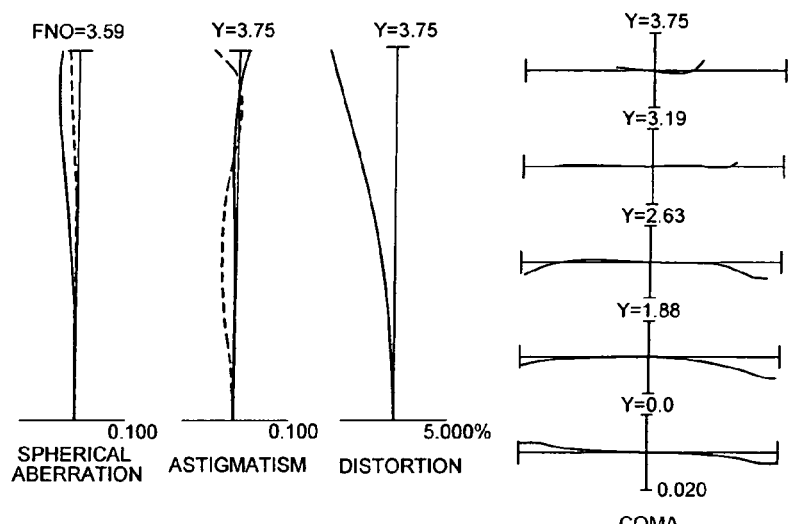
Figure 26B:
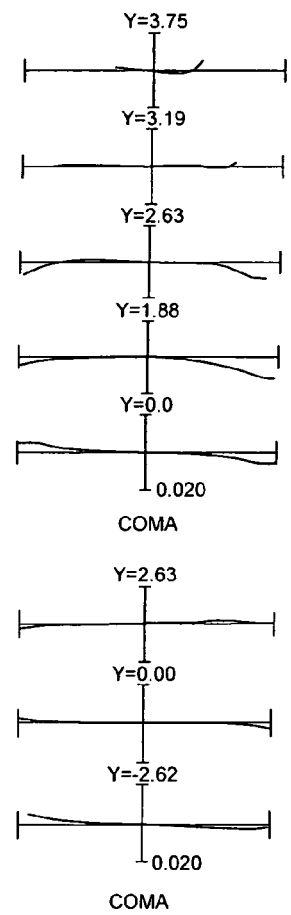
Figure 27A:
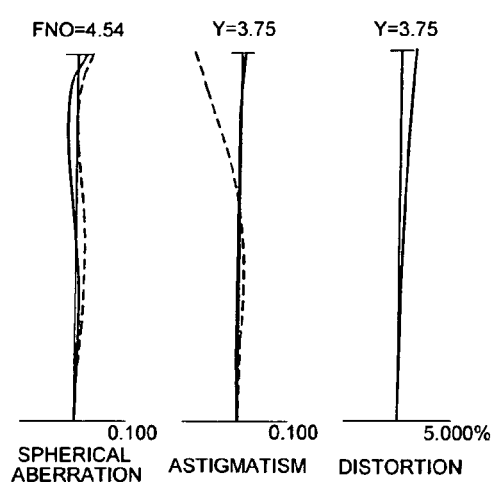
Figure 27B:
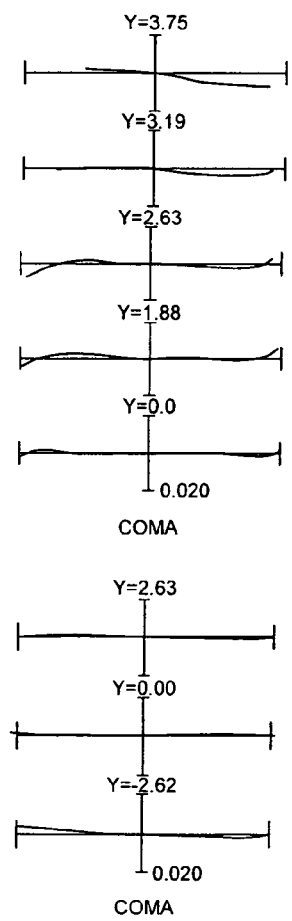
Figure 28A:
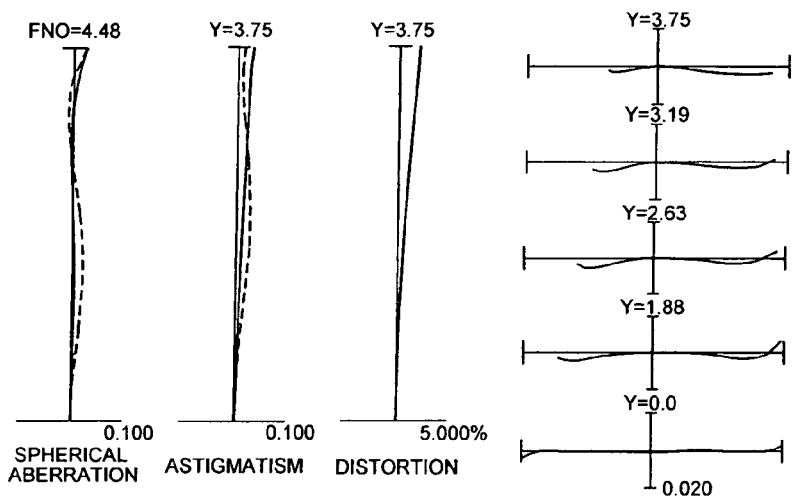
Figure 28B:
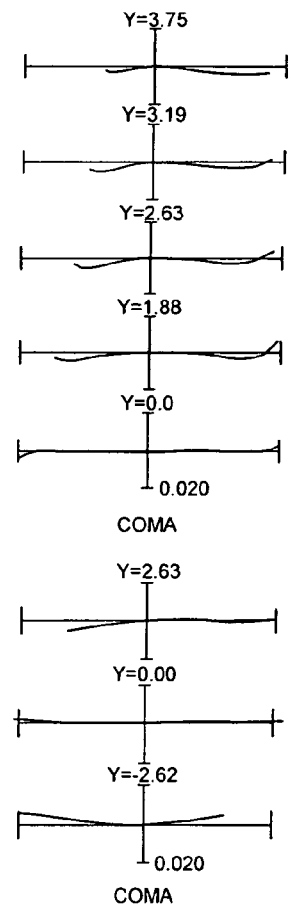
Figures 29A, 29B:
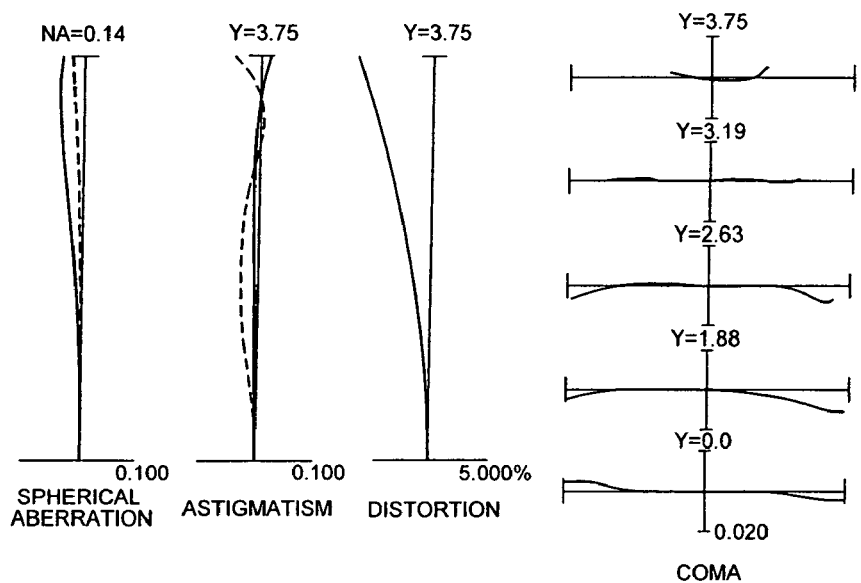
Figure 30A:
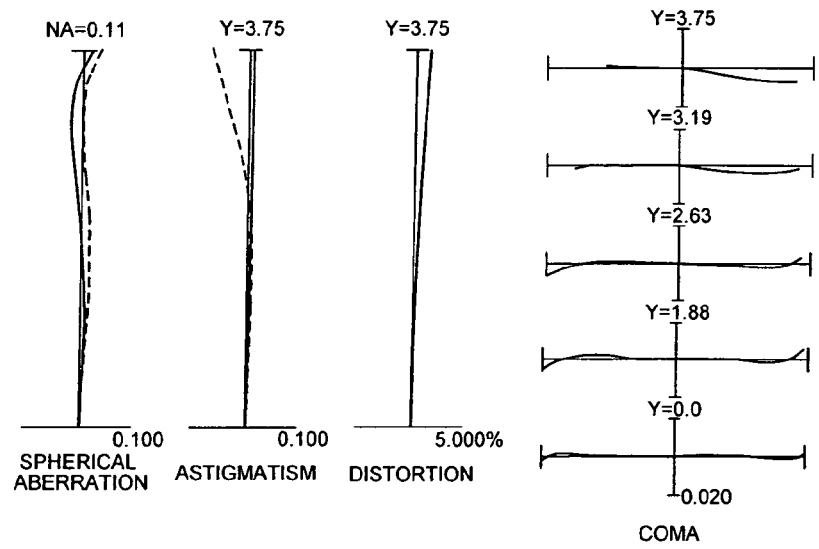
Figure 30B:
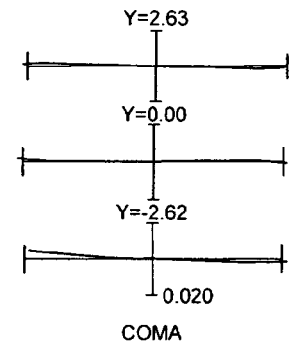
Figure 31A:
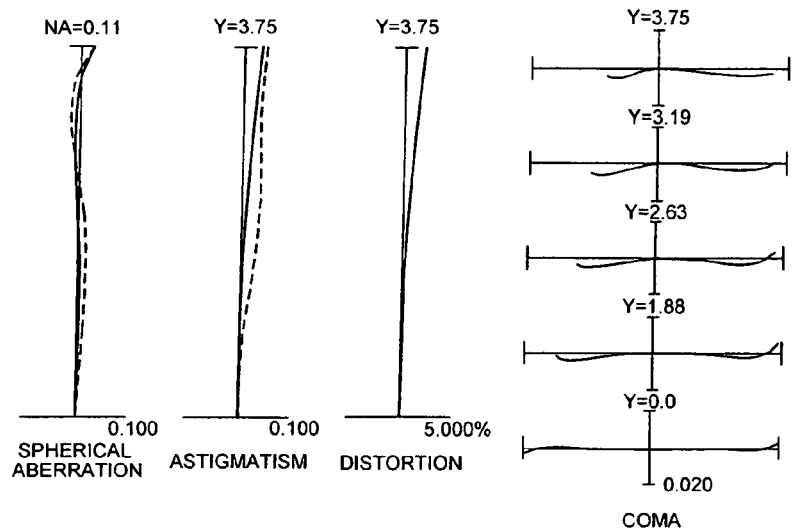
Figure 31B:
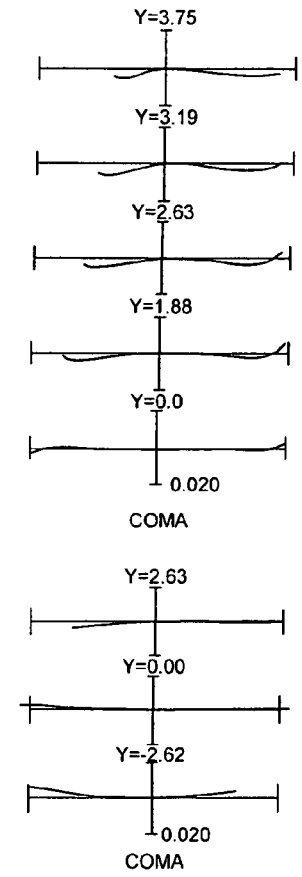

FIGS. 26A and 26B are graphs showing various aberrations of the zoom lens system according to Example 5 in a wide-angle end state upon focusing on infinity, in which FIG. 26A shows various aberrations without carrying out vibration reduction, and FIG. 26B shows coma upon carrying out vibration reduction. FIGS. 27A and 27B are graphs showing various aberrations of the zoom lens system according to Example 5 in an intermediate focal length state upon focusing on infinity, in which FIG. 27A shows various aberrations without carrying out vibration reduction, and FIG. 27B shows coma upon carrying out vibration reduction. FIGS. 28A and 28B are graphs showing various aberrations of the zoom lens system according to Example 5 in a telephoto end state upon focusing on infinity, in which FIG. 28A shows various aberrations without carrying out vibration reduction, and FIG. 28B shows coma upon carrying out vibration reduction. FIGS. 29A and 29B are graphs showing various aberrations of the zoom lens system according to Example 5 in the wide-angle end state upon focusing on a shooting distance R=1500 mm, in which FIG. 29A shows various aberrations without carrying out vibration reduction, and FIG. 29B shows coma upon carrying out vibration reduction. FIGS. 30A and 30B are graphs showing various aberrations of the zoom lens system according to Example 5 in the intermediate focal length state upon focusing on a shooting distance R=1500 mm, in which FIG. 30A shows various aberrations without carrying out vibration reduction, and FIG. 30B shows coma upon carrying out vibration reduction. FIGS. 31A and 31B are graphs showing various aberrations of the zoom lens system according to Example 5 in the telephoto end state upon focusing on a shooting distance R=1500 mm, in which FIG. 31A shows various aberrations without carrying out vibration reduction, and FIG. 31B shows coma upon carrying out vibration reduction.

As is apparent from the respective graphs, the zoom lens system according to Example 5 shows superb optical performance as a result of good corrections to various aberrations in each focal length state from the wide-angle end state to the telephoto end state.

EXAMPLE 6

FIG. 32 is a diagram showing a lens configuration of a zoom lens system according to Example 6 of the second embodiment. Although the zoom lens system according to Example 6 deflects its optical path by 90 degrees as shown in FIG. 2, the optical path is extended in FIG. 32.

In FIG. 32, the zoom lens system according to Example 6 is composed of, in order from an object, a first lens group G1 having positive refractive power and a rectangular prism P for bending the optical path by 90 degrees, the second lens group G2 having negative refractive power, a third lens group G3 having positive refractive power, and a fourth lens group G4 having positive refractive power. When the focal length varies from a wide-angle end state W to a telephoto end state T, the first lens group G1 and the third lens group G3 are fixed with respect to the image plane I, the second lens group G2 is moved to the image plane I, and the fourth lens group G4 is moved at first to the object and then to the image plane I such that a distance between the first lens group G1 and the second lens group G2 increases, and a distance between the second lens group G2 and the third lens group G3 decreases. Focusing from infinity to a close object is carried out by moving the fourth lens group G4 along the optical axis in the wide-angle end state W and the telephoto end state T, and by moving the second lens group G2 along the optical axis in the other focal length states.

The first lens group G1 is composed of, in order from the object along the optical axis, a negative meniscus lens L11 having a convex surface facing the object, a rectangular prism P for bending the optical path by 90 degrees, a double convex positive lens L12, and a double convex positive lens L13.

The second lens group G2 is composed of, in order from the object along the optical axis, a double concave negative lens L21, and a cemented lens constructed by a double concave negative lens L22 cemented with a double convex positive lens L23.

The third lens group G3 is composed of, in order from the object along the optical axis, a double convex positive lens L31, and a cemented lens constructed by a double convex positive lens L32 cemented with a double concave negative lens L33. An image blur on the image plane I upon generating a camera shake is corrected by shifting the third lens group G3 in the direction substantially perpendicular to the optical axis.

The fourth lens group G4 is composed of, in order from the object along the optical axis, a double convex positive lens L41, a cemented lens constructed by a double convex positive lens L42 cemented with a double concave negative lens L43, and a positive meniscus lens L44 having a convex surface facing the object.

An aperture stop S is disposed in the vicinity of the most object side lens of the third lens group G3 and fixed upon zooming from the wide-angle end state W to the telephoto end state T.

Between the fourth lens group G4 and the image plane I, there are provided a low pass filter LF for blocking spatial frequency higher than the resolution limit of the solid-state imaging device such as a CCD, and a cover glass CG for protecting the solid-state imaging device.

Various values associated with Example 6 are listed in Table 6.

TABLE 6

[Specifications]

|  | W | M | T |
|---|---|---|---|
| f = | 6.51 | 17.75 | 30.716 |
| FNO = | 3.61 | 4.55 | 4.49 |
| ω = | 31.67 | 11.76 | 6.83° |
| Bf = | 0.70 | | |

[Lens Data]

|  | r | d | vd | nd |
|---|---|---|---|---|
| 1) | 27.0714 | 1.0000 | 23.78 | 1.846660 |
| 2) | 10.8124 | 3.1000 | | |
| 3) | ∞ | 6.0000 | 46.57 | 1.804000 |
| 4) | ∞ | 0.0000 | 46.57 | 1.804000 |
| 5) | ∞ | 6.0000 | 46.57 | 1.804000 |
| 6) | ∞ | 0.2000 | | |
| 7) | 88.3161 | 2.1000 | 58.19 | 1.622630 |
| *8) | −20.7757 | 0.2000 | | |
| 9) | 17.3587 | 2.2000 | 82.56 | 1.497820 |
| 10) | −121.5800 | (D1) | | |
| 11) | −21.8799 | 0.8000 | 42.71 | 1.820800 |
| *12) | 9.5495 | 1.1000 | | |
| 13) | −10.0479 | 0.8000 | 52.32 | 1.754998 |
| 14) | 11.2226 | 1.8000 | 23.78 | 1.846660 |
| 15) | −20.5128 | (D2) | | |
| 16> | ∞ | 0.2000 | Aperture Stop S | |
| 17) | 7.4197 | 2.2000 | 58.19 | 1.622630 |
| *18) | −32.4532 | 0.2000 | | |
| 19) | 7.3179 | 2.3000 | 65.44 | 1.603001 |
| 20) | −8.1840 | 0.8000 | 40.76 | 1.882997 |
| 21) | 5.5046 | (D3) | | |
| 22) | 7.3400 | 2.7000 | 64.06 | 1.516330 |
| *23) | −19.6770 | 0.2000 | | |
| 24) | 11.5934 | 2.8000 | 82.56 | 1.497820 |
| 25) | −7.3626 | 0.8000 | 40.76 | 1.882997 |
| 26) | 7.6006 | 0.9000 | | |

TABLE 6-continued

| | | | | |
|---|---|---|---|---|
| 27) | 8.9259 | 1.8000 | 70.23 | 1.487490 |
| 28) | 362.0690 | (D4) | | |
| 29) | ∞ | 1.6500 | 70.51 | 1.544370 |
| 30) | ∞ | 0.5000 | | |
| 31) | ∞ | 0.5000 | 64.14 | 1.516330 |
| 32) | ∞ | (Bf) | | |

[Aspherical Surface Data]

Surface number: 8 k = +3.6749
C4 = +2.02720E−05
C6 = +1.39580E−07
C8 = +1.76940E−11
C10 = +8.15890E−12

Surface number: 12 k = −1.9761
C4 = +2.69980E−04
C6 = 0.00000E+00
C8 = 0.00000E+00
C10 = 0.00000E+00

Surface number: 18 k = −15.8053
C4 = +6.81820E−05
C6 = −2.95960E−06
C8 = +2.07110E−08
C10 = 0.00000E+00

Surface number: 23 k = −61.0236
C4 = −8.23580E−04
C6 = +5.93180E−05
C8 = −2.54540E−06
C10 = +4.50460E−08

| | W | M | T |
|---|---|---|---|
| [Zooming Data] | | | |
| f | 6.51005 | 17.75126 | 30.71656 |
| D1 | 1.19950 | 8.28210 | 12.28587 |
| D2 | 12.28609 | 5.20376 | 1.19964 |
| D3 | 8.98739 | 3.72664 | 3.98937 |
| D4 | 2.97987 | 8.24053 | 7.97793 |
| [Focusing Data] | | | |
| D0 | 1500.00000 | 1500.00000 | 1500.00000 |
| D1 | 1.19950 | 8.02351 | 12.28587 |
| D2 | 12.28609 | 5.46235 | 1.19964 |
| D3 | 8.95888 | 3.72664 | 3.32442 |
| D4 | 3.00838 | 8.24053 | 8.64288 |

Figure 33A:
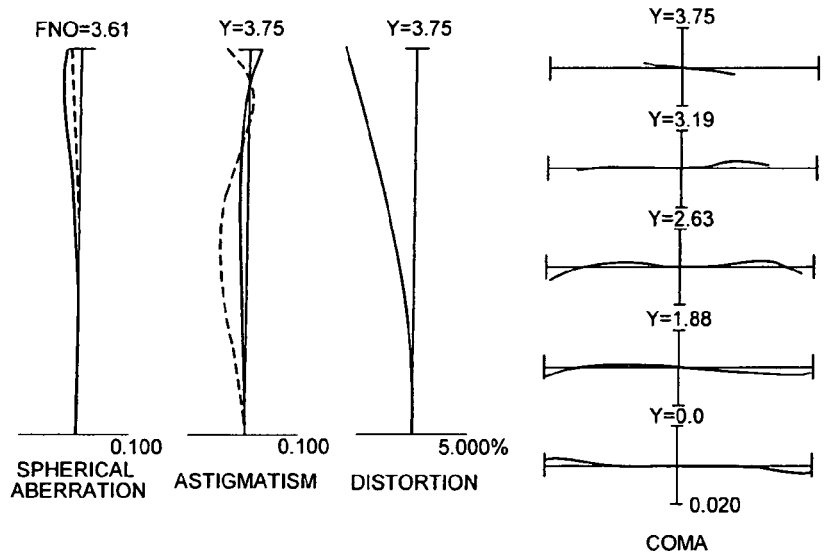
Figure 33B:
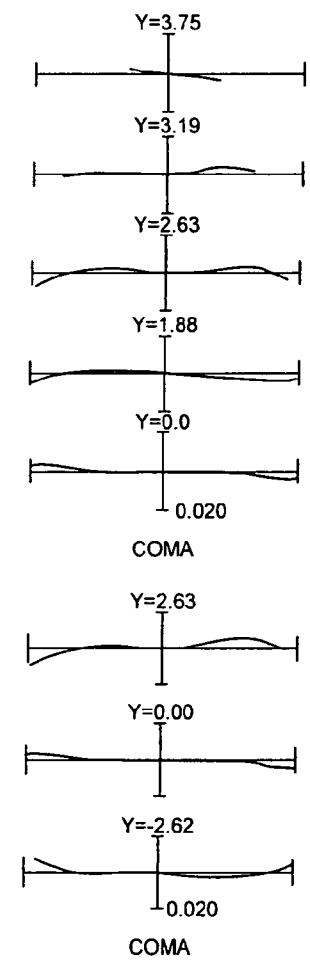
Figure 35A:
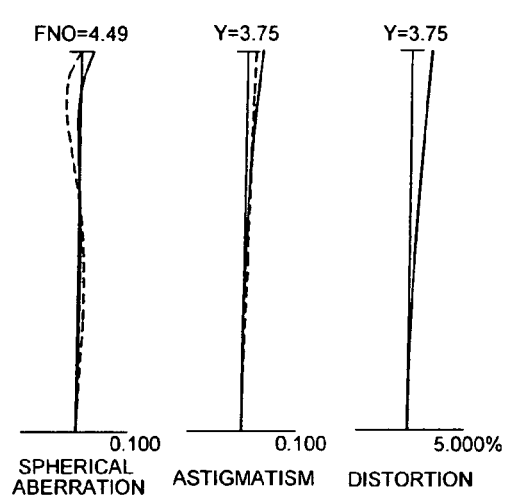
Figure 35B:
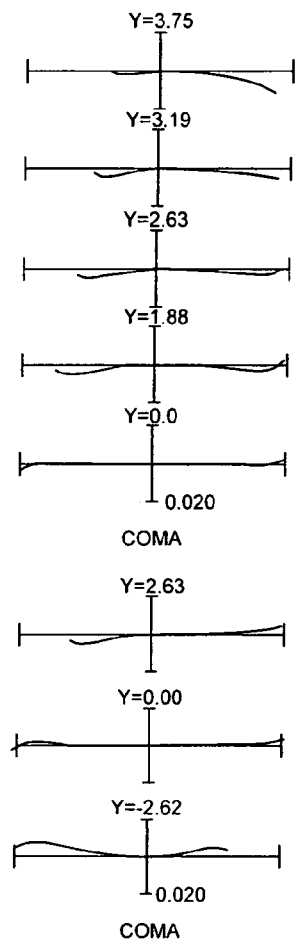
Figure 36A:
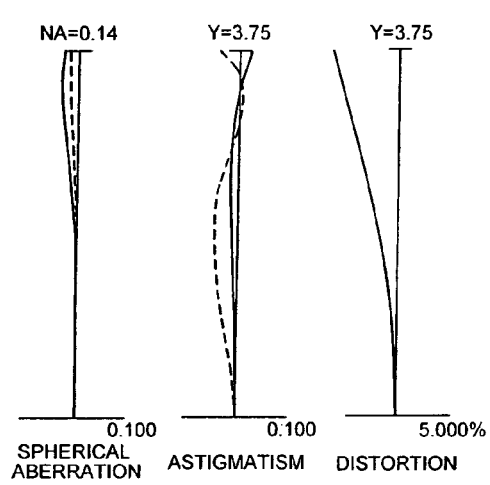
Figure 36B:
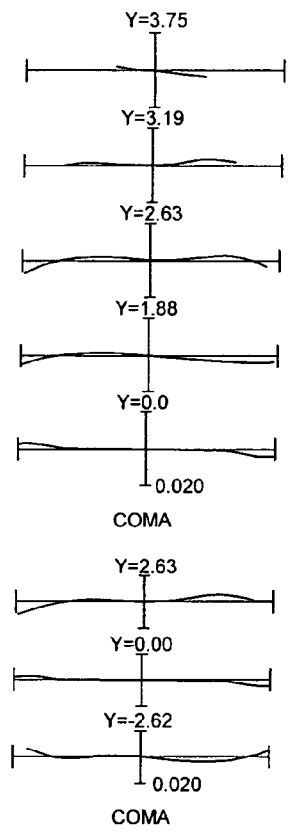
Figure 38A:
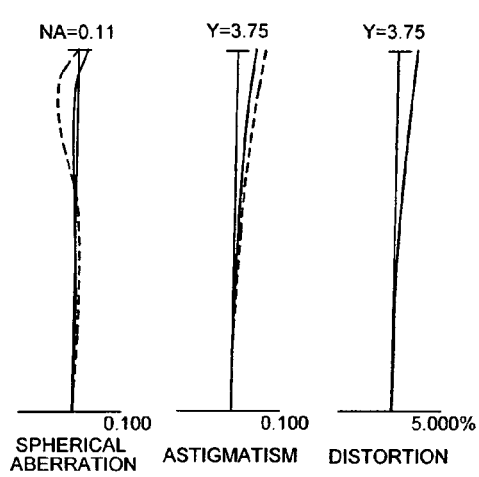
Figure 38B:
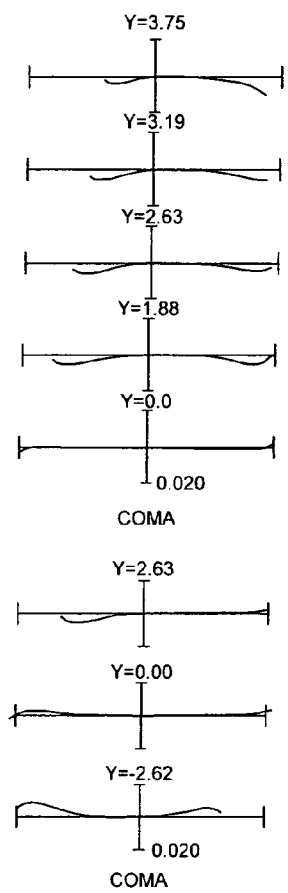

FIGS. 33A and 33B are graphs showing various aberrations of the zoom lens system according to Example 6 in a wide-angle end state upon focusing on infinity, in which FIG. 33A shows various aberrations without carrying out vibration reduction, and FIG. 33B shows coma upon carrying out vibration reduction. FIGS. 34A and 34B are graphs showing various aberrations of the zoom lens system according to Example 6 in an intermediate focal length state upon focusing on infinity, in which FIG. 34A shows various aberrations without carrying out vibration reduction, and FIG. 34B shows coma upon carrying out vibration reduction. FIGS. 35A and 35B are graphs showing various aberrations of the zoom lens system according to Example 6 in a telephoto end state upon focusing on infinity, in which FIG. 35A shows various aberrations without carrying out vibration reduction, and FIG. 35B shows coma upon carrying out vibration reduction. FIGS. 36A and 36B are graphs showing various aberrations of the zoom lens system according to Example 6 in the wide-angle end state upon focusing on a shooting distance R=1500 mm, in which FIG. 36A shows various aberrations without carrying out vibration reduction, and FIG. 36B shows coma upon carrying out vibration reduction. FIGS. 37A and 37B are graphs showing various aberrations of the zoom lens system according to Example 6 in the intermediate focal length state upon focusing on a shooting distance R=1500 mm, in which FIG. 37A shows various aberrations without carrying out vibration reduction, and FIG. 37B shows coma upon carrying out vibration reduction. FIGS. 38A and 38B are graphs showing various aberrations of the zoom lens system according to Example 6 in the telephoto end state upon focusing on a shooting distance R=1500 mm, in which FIG. 38A shows various aberrations without carrying out vibration reduction, and FIG. 38B shows coma upon carrying out vibration reduction.

As is apparent from the respective graphs, the zoom lens system according to Example 6 shows superb optical performance as a result of good corrections to various aberrations in each focal length state from the wide-angle end state to the telephoto end state.

In each Example in both embodiments, at least one surface of a positive lens may be formed with a diffractive surface. At least one positive lens may be a graded-index lens (GRIN lens).

In each Example in both embodiments, the focusing lens group(s) may be used for auto focus, and suitable for being driven by a motor such as an ultrasonic motor.

In each Example in both embodiments, the aspherical surface may be fabricated by a fine grinding process, a glass molding process that a glass material is formed into an aspherical shape by a mold, or a compound type process that a resin material is formed into an aspherical shape on a glass surface.

In each Example in both embodiments, an antireflection coating having high transmittance over a broad wavelength range may be applied to each lens surface to reduce flare or ghost images, so that high optical performance with a high contrast can be attained.

Incidentally, it is needless to say that although zoom lens systems with a four-lens-group configuration are shown as respective Examples of the present invention, a zoom lens system simply added by a lens group to the four-lens-group configuration is included in the spirit or scope of the present invention. Moreover, in the configuration of each lens group, a lens group simply added by lens elements to the lens group shown in Examples is included in the spirit or scope of the present invention.

As described above, the present invention makes it possible to provide a zoom lens system having a zoom ratio of 4.5 or more, ultra-compactness, high optical performance, and a vibration reduction function for correcting an image blur on the image plane caused by a camera shake, and is suitable for an optical device such as a compact video camera and an electronic still camera, which has a limited space for disposing a zoom lens system. In addition, the present invention makes it possible to provide an optical device that equips the zoom lens system.

Additional advantages and modifications will readily occur to those skilled in the art. Therefore, the invention in its broader aspect is not limited to the specific details, and representative devices shown and described herein. Accordingly, various modifications may be made without departing from the spirit or scope of the general inventive concept as defined by the appended claims and their equivalents.

What is claimed is:

1. A zoom lens system comprising, in order from an object along an optical axis:
   a first lens group having an optical path bending member for bending the optical path by substantially 90 degrees;
   a second lens group;
   a third lens group; and
   a fourth lens group;
   wherein when a focal length varies from a wide-angle end state to a telephoto end state, the first lens group and the third lens group are fixed with respect to an image plane, the second lens group is moved to the image plane, and the fourth lens group is moved at first to the object and then to the image plane; and
   wherein focusing from infinity to a close object is carried out by moving the fourth lens group along the optical axis in the wide-angle end state and the telephoto end state, and carried out by moving the second lens group along the optical axis in the other focal length states.

2. The zoom lens system according to claim 1, wherein the first lens group has positive refractive power, the second lens group has negative refractive power, the third lens group has positive refractive power, and the fourth lens group has positive refractive power.

3. The zoom lens system according to claim 2, wherein the third lens group comprises, in order from the object along the optical axis, a positive lens and a cemented lens constructed by a positive lens cemented with a negative lens.

4. The zoom lens system according to claim 3, wherein the fourth lens group comprises, in order from the object along the optical axis, a positive lens, a cemented lens constructed by a positive lens cemented with a negative lens, and a positive lens.

5. The zoom lens system according to claim 4, wherein the first lens group comprises, in order from the object along the optical axis, a negative lens, the optical path bending member, a positive lens, and a positive lens.

6. The zoom lens system according to claim 5, wherein the optical path bending member is a rectangular prism.

7. The zoom lens system according to claim 6, wherein an aperture stop is disposed in the vicinity of the third lens group including in the third lens group.

8. The zoom lens system according to claim 1, wherein the third lens group has positive refractive power and comprises, in order from the object along the optical axis, a positive lens and a cemented lens constructed by a positive lens cemented with a negative lens.

9. The zoom lens system according to claim 1, wherein the fourth lens group has positive refractive power and comprises, in order from the object along the optical axis, a positive lens, a cemented lens constructed by a positive lens cemented with a negative lens, and a positive lens.

10. The zoom lens system according to claim 1, wherein the first lens group has positive refractive power and comprises, in order from the object along the optical axis, a negative lens, the optical path bending member, a positive lens, and a positive lens.

11. The zoom lens system according to claim 1, wherein at least one aspherical lens is included in each of the first lens group through the fourth lens group.

12. The zoom lens system according to claim 1, wherein the optical path bending member is a rectangular prism.

13. The zoom lens system according to claim 1, wherein an aperture stop is disposed in the vicinity of the third lens group including in the third lens group.

14. The zoom lens system according to claim 1, wherein an image blur on the image plane upon generating a camera shake is corrected by moving the third lens group in a direction perpendicular to the optical axis.

15. An optical device equipped with a zoom lens system, said zoom lens system comprising, in order from an object along an optical axis:
   a first lens group having an optical path bending member for bending the optical path by substantially 90 degrees;
   a second lens group;
   a third lens group; and
   a fourth lens group;
   wherein when a focal length varies from a wide-angle end state to a telephoto end state, the first lens group and the third lens group are fixed with respect to an image plane, the second lens group is moved to the image plane, and the fourth lens group is moved at first to the object and then to the image plane; and
   wherein focusing from infinity to a close object is carried out by moving the fourth lens group along the optical axis in the wide-angle end state and the telephoto end state, and carried out by moving the second lens group along the optical axis in the other focal length states.

16. A method for forming an image of an object and varying a focal length of a zoom lens system, the method comprising steps of:
   providing the zoom lens system that includes, in order from the object along an optical axis, a first lens group having an optical path bending member for bending the optical path by substantially 90 degrees, a second lens group, a third lens group, and a fourth lens group;
   varying the focal length of the zoom lens system from a wide-angle end state to a telephoto end state by fixing the first lens group and the third lens group with respect to an image plane, moving the second lens group to the image plane, and moving the fourth lens group at first to the object and then to the image plane; and
   carrying out focusing from infinity to a close object by moving the fourth lens group along the optical axis in the wide-angle end state and the telephoto end state, and moving the second lens group along the optical axis in the other focal length states.

17. The method according to claim 16, further comprising a step of:
   providing the first lens group having positive refractive power, the second lens group having negative refractive power, the third lens group having positive refractive power, and the fourth lens group having positive refractive power.

18. The method according to claim 16, further comprising a step of:
   correcting an image blur on the image plane upon generating a camera shake by moving the third lens group in a direction perpendicular to the optical axis.

19. The method according to claim 16, further comprising a step of:
   providing the third lens group that comprises, in order from the object along the optical axis, a positive lens and a cemented lens constructed by a positive lens cemented with a negative lens.

* * * * *